United States Patent [19]

Heath

[11] Patent Number: 4,493,028

[45] Date of Patent: Jan. 8, 1985

[54] DUAL MODE I/O

[75] Inventor: Chester A. Heath, Boca Raton, Fla.

[73] Assignee: International Business Machines Corp., Armonk, N.Y.

[21] Appl. No.: 345,161

[22] Filed: Feb. 2, 1982

[51] Int. Cl.³ .................. G06F 3/00; G06F 15/06
[52] U.S. Cl. .................. 364/200; 178/22.09
[58] Field of Search .................. 178/22.09, 22.19; 364/200 MS File, 900 MS File

[56] References Cited

U.S. PATENT DOCUMENTS

| | | | |
|---|---|---|---|
| 3,909,799 | 9/1975 | Recks et al. | 364/200 |
| 4,093,981 | 6/1978 | McAllister et al. | 364/200 |
| 4,099,236 | 7/1978 | Goodman et al. | 364/200 |
| 4,115,852 | 9/1978 | Rozell | 364/200 |
| 4,184,200 | 1/1980 | Wagner et al. | 364/200 |
| 4,246,637 | 1/1981 | Brown et al. | 364/200 |
| 4,247,893 | 1/1981 | Anderson et al. | 364/200 |

Primary Examiner—James D. Thomas
Assistant Examiner—David L. Clark
Attorney, Agent, or Firm—Robert Lieber

[57] ABSTRACT

This secondary processing attachment to a primary (host) data processing system provides a dual mode I/O operation having unique "real time" applications. In this mode the attachment subsystem may exchange data concurrently with two potentially separate storage areas in host system main storage, under the direction of a single device control block (DCB) command descriptor prepared by host system software. Examples of real time processing applications include encryption and decryption of "secure" data by the attachment subsystem, matrix multiplication, or signal processing operations by the subsystem, and conservative movement of data between host storage and process control devices which link to the attachment subsystem via a device multiplexor and are co-addressed with that subsystem (by the host system).

9 Claims, 18 Drawing Figures

FIG. 6 (COMMAND LIST FORMAT)
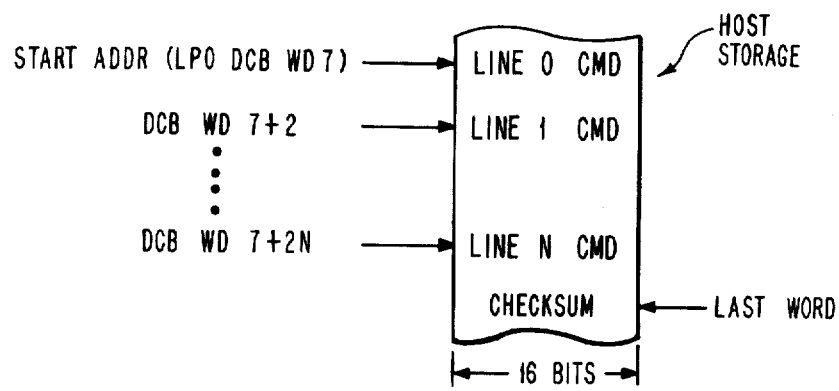
FIG. 7
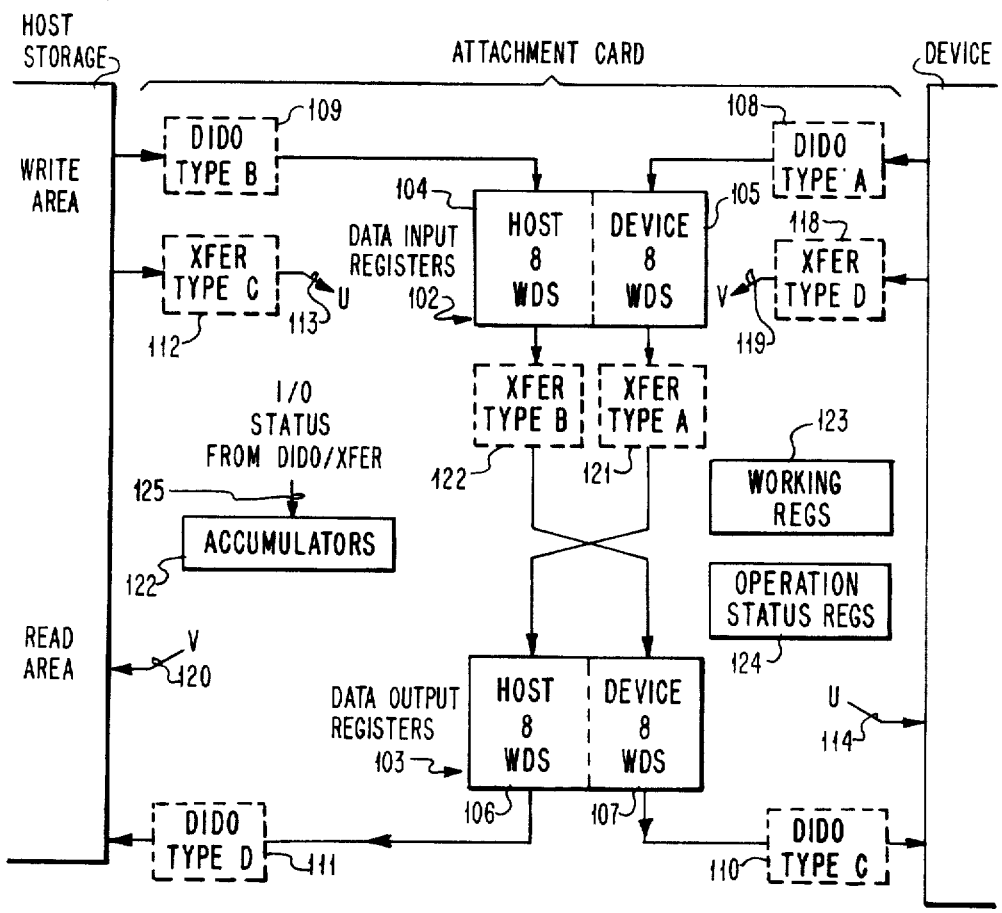

8K ROS SUBROUTINES AND MICROCODE MEMORY MAP

\* 21 SEC TIMEOUT NOT SHOWN

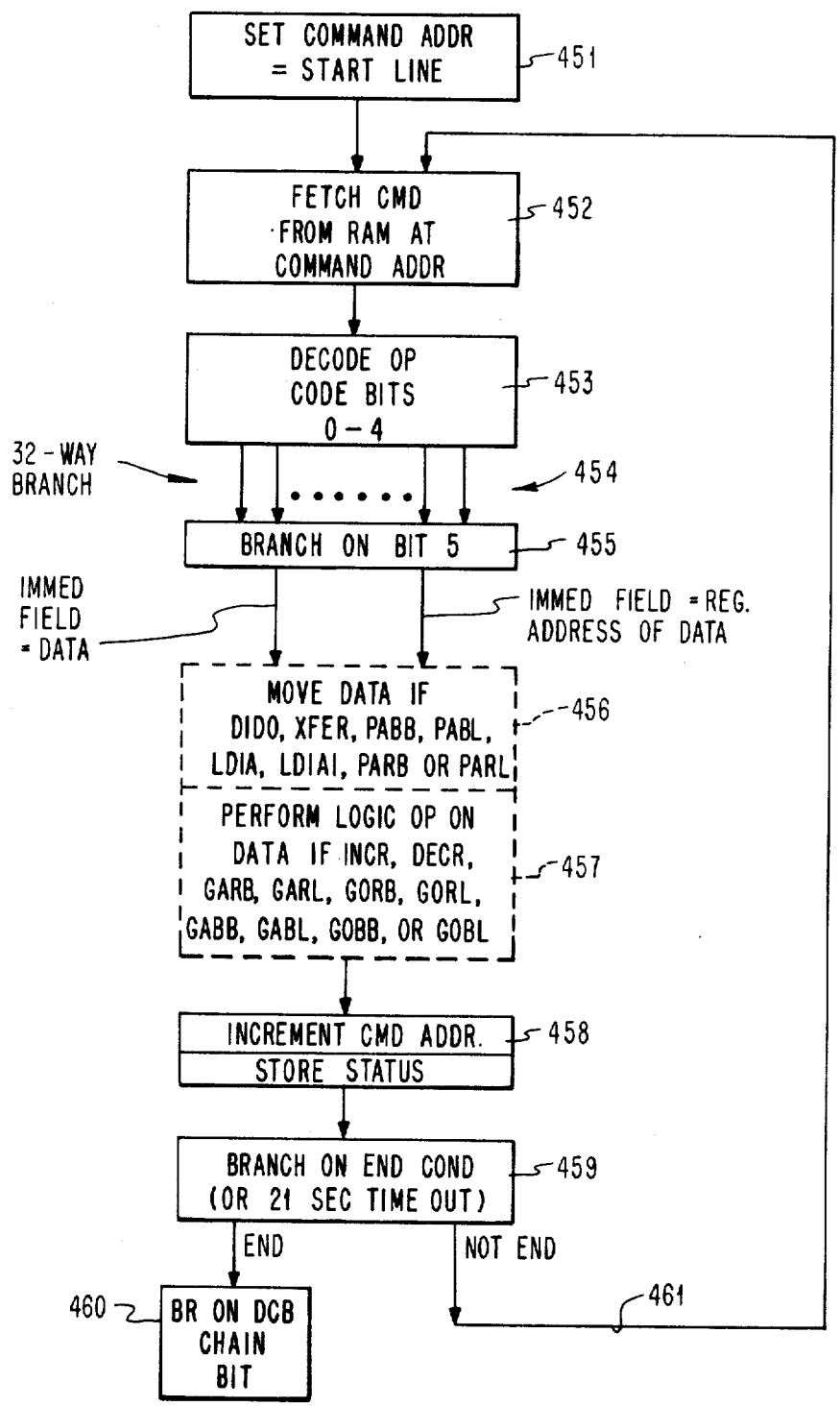

DUAL MODE I/O

CROSS-REFERENCES TO RELATED APPLICATIONS

The present patent application is related to the following copending patent applications:

(1) Application Ser. No. 345,177, filed Feb. 2, 1982 entitled "PERIPHERAL INTERFACE ADAPTER CIRCUIT FOR USE IN I/O CONTROLLER CARD HAVING MULTIPLE MODES OF OPERATION", the inventor being C. A. Heath; and (2) U.S. Pat. No. 4,451,884, entitled "CYCLE STEALING I/O CONTROLLER WITH PROGRAMMABLE OFF-LINE MODE OF OPERATION", the inventors being C. A. Heath et al; and (3) Application Ser. No. 345,129, filed Feb. 2, 1982 entitled "PERIPHERAL ATTACHMENT INTERFACE FOR I/O CONTROLLER HAVING CYCLE STEAL AND OFF-LINE MODES", the inventors being L. P. Andrews et al.

The descriptions set forth in these copending applications are hereby incorporated in the present application by this reference thereto.

BACKGROUND OF THE INVENTION

1. Field of the Invention

This invention relates to data processing systems in which I/O operations between main storage of a primary data processing system and peripheral devices are controlled by intelligent controllers.

2. Prior Art

Contemporary data processing systems have considerable processing "power" distributed outside of the primary or host systems which perform the major "number crunching" processes. Such systems contain I/O controllers and devices which operate under the direction of programmable microprocessors. Although used primarily for directing input/output (I/O) operations between associated devices and primary systems such microprocessors represent general purpose processing resources which could be delegated additional processing responsibilities by the primary systems if appropriate applications could be found which would not be entirely incompatible with presently used command architectures.

Consider, for example, the problem of encrypting and decrypting large data sets (e.g. 10,000 bytes or more) for transmission between primary processing centers over non-secure data communication links. Assume, for instance, that each center had attached to it (via a relatively secure link) a controller containing microprocessing intelligence programmable to perform the transformations (encryption/decryption) but inadequate storage capacity to hold the large data set, and adapted relative to the primary system to receive secondary programs of instructions for enabling it to conduct the transformation operations, in addition to the programming needed for its "principal" I/O control functions. Obviously, such controllers could not be used as "satellite" encryption/decryption processors, in these circumstances, without breaking up each large data set into smaller subsets, and scheduling the subset transfers as discretely separate I/O operations. But when the processing workload presented to the primary system in respect to scheduling such discrete subset transfers is compared to the processing load it would carry if it were to conduct the transformation itself it becomes clearly impractical to consider the use of attached microprocessing facilities for such operations. Furthermore, such subset operations would not be practical for use with those coding algorithms which relate each byte or word transformation to the results of previous byte or word transformations.

SUMMARY OF THE INVENTION

The present invention permits a primary processing system to efficiently exchange large data sets with a secondary processing subsystem having limited storage capacity while enabling the secondary subsystem to perform satellite processing operations on entire sets.

It also permits such a primary system to transfer a large data set to a device while receiving another large data set from the same device, without having to overwrite or obliterate the first set, whereby the transfer of the first set is repeatable in the event an error occurs in its original transfer. It also permits the primary system to schedule both transfers in a single I/O scheduling process.

In accordance with the invention, certain device control block (DCB) arrays employed by a primary system as I/O command descriptors, for directing data transfers through operations of I/O controller type attachments, are adapted to permit each DCB to be used to define plural areas of main storage in the respective primary system, and associated I/O controller attachments are adapted to use each such DCB to sustain plural separate data transfer operations, relative to the storage areas defined by that DCB, during a single continuous attachment/device selection period associated with its "interpretation" of that DCB.

These plural mode DCBs and associated attachment adaptations are considered features of the present invention. Furthermore, certain "satellite" data processing applications made practical by these adaptations are considered presently unique.

DCBs, or equivalent primary attachment directing commands, which are individually adaptable in accordance with the present invention to define plural areas of primary system storage, are referred to herein as plural mode DCBs or I/O commands. In the embodiment of the invention specifically disclosed herein an attachment/controller (secondary processing) subsystem, responsive to a "dual mode" DCB prepared by a primary system, is adapted to conduct data transfer operations intermittently relative to two storage areas in the primary system which are definable in that DCB (hence, the present title of "dual mode I/O") over a single continuous period in which the attachment is under the control of that DCB (and has continuous eligibility for accessing primary system storage). However, as the description of this embodiment develops those skilled in the art will appreciate that the techniques presently described are extendable to sustain equivalent operations relative to more than two definable storage areas without any additional invention.

For a more complete understanding of the invention and a comprehension of other features and advantages thereof, reference should be made to the following description in connection with the accompanying drawings and to the appended claims which indicate the scope of the invention.

BRIEF DESCRIPTION OF THE DRAWINGS

FIG. 6 illustrates the form of a secondary command list array in accordance with the present invention.

FIG. 7 illustrates the logical organization of a secondary subsystem for moving data between a memory in that subsystem and either a primary subsystem or device in response to indicated secondary commands.

FIGS. 16-18 respectively illustrate microprocessor interpretation sequences for IDCB handling, DCB retrieval/interpretation and secondary command (command list) retrieval/interpretation.

DETAILED DESCRIPTION

TABLE OF CONTENTS

| HEADING NO. | HEADING TITLE |
|---|---|
| | INTRODUCTION |
| 1 | INTRODUCTION |
| 2 | MODE SELECTION |
| 3 | DCB INTERPRETATION, LPO TYPE - GENERAL |
| 4 | DCB INTERPRETATION, SPO TYPE - GENERAL |
| 5 | LOGICAL SEQUENCE OF I/O INITIATION |
| 6 | DCB FORMATS - GENERAL |
| 7 | DCB FORMAT, HS MODE |
| 8 | DCB FORMATS, PO MODE |
| 8.1 | PO MODE, LPO TYPE |
| 8.2 | PO MODE, SPO TYPE |
| 9 | INTERRUPT STATUS INFORMATION |
| 9.1 | INTERRUPT ID WORD |
| 9.2 | RESIDUAL STATUS BLOCK |
| 10 | PO MODE SECONDARY COMMANDS |
| 10.1 | COMMAND FORMATS - GENERAL |
| 10.2 | COMMAND DESCRIPTIONS |
| 10.2.1 | EXTERNAL-INTERNAL DATA MOVEMENT |
| 10.2.2 | INTERNAL DATA MOVEMENT |
| 10.2.3 | ACCUMULATOR OPERATIVES |

TABLE OF CONTENTS-continued

| HEADING NO. | HEADING TITLE |
|---|---|
| | INTRODUCTION |
| 10.2.4 | CONDITIONAL JUMPS |
| 10.2.5 | ATTACMENT HARDWARE CONTROL |
| 10.3 | SUMMARY OF COMMAND SEQUENCES |
| 11 | DEVICE INTERFACE FORMATS |
| 12 | MICROPROCESSOR ORGANIZATION AND MEMORY MAP |
| 13 | EXAMPLES OF PO MODE APPLICATIONS |
| 13.1 | HEX TO DECIMAL CONVERSION |
| 13.2 | CHECKSUM CALCULATION |
| 13.3 | APPLICATION USING PO AND HS MODES |
| 13.4 | DUAL MODE APPLICATIONS |
| 13.5 | MULTIPLEXING/DEMULTIPLEXING APPLICATION |
| 14 | REVIEW OF SYSTEM OPERATIONS. CONCLUSIONS-- |

Figure 1:
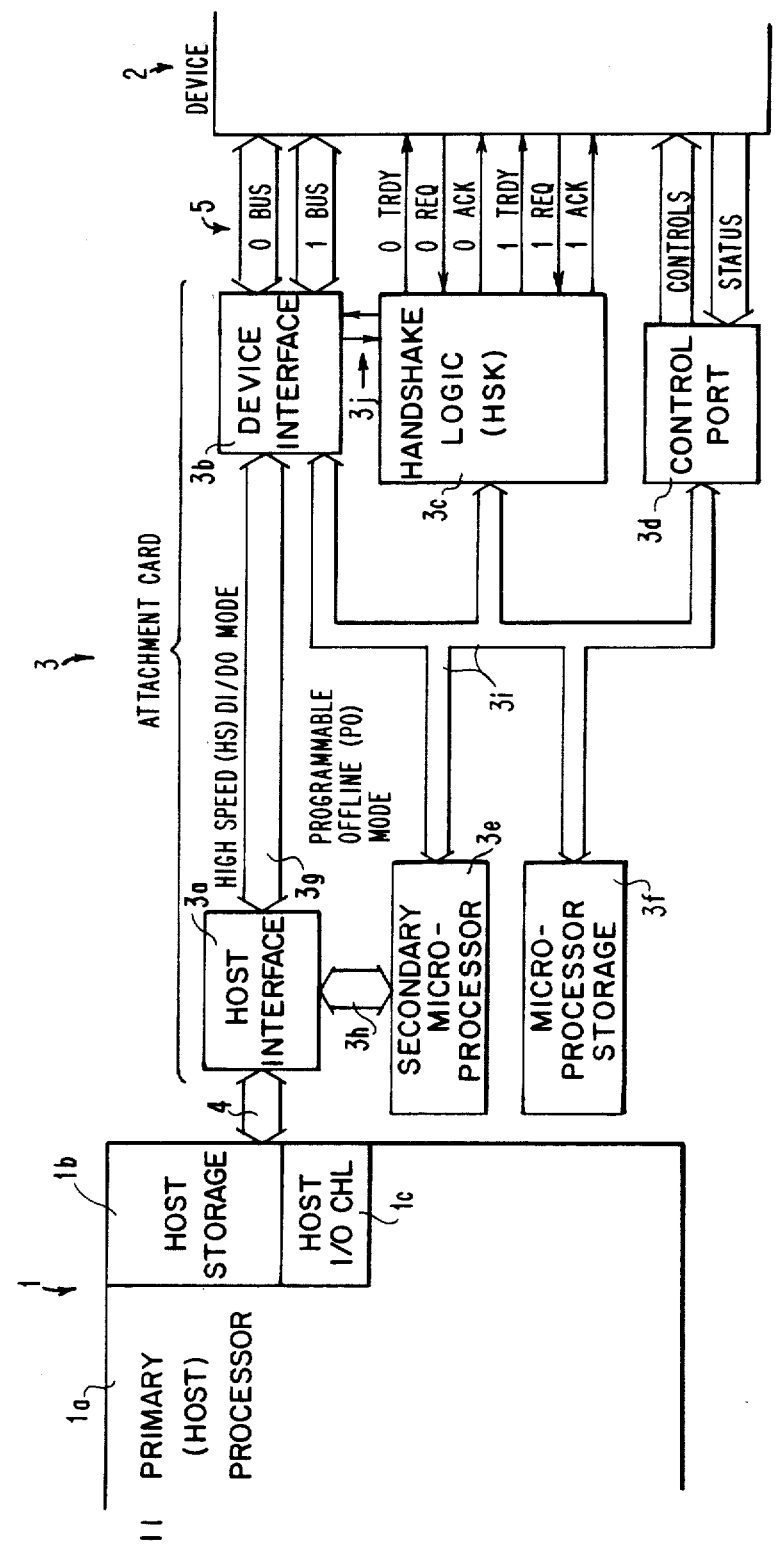
FIG. 1 is a system block diagram broadly illustrating a system environment in which the present invention is useful.

FIG. 1 schematically illustrates an environmental system incorporating an embodiment of the invention. Primary data processing subsystem 1 communicates with peripheral device or device multiplexor 2 through secondary processing subsystem 3. Primary subsystem 1 is conventionally configured and includes a central processing unit 1a, a memory 1b, and one or more I/O channels 1c. For certain presently contemplated real time process control applications an IBM Series/1 processing system with architecture modifications described herein would be entirely adequate for embodying the subsystem 1. For background descriptions of relevant aspects of Series/1 systems reference may be made to IBM Publication G 360-0061-5, File No. 51-00 "IBM Series/1 Digest", Copyright 1981 International Business Machines Corp., and U.S. Pat. Nos. 4,038,642 to Bouknecht et al (entitled "Input/Output Interface Logic") and 4,053,950 to Bourke et al (entitled "Residual Status Reporting During Chained Cycle Steal Input/Output Operations").

Subsystem 3 comprises: a host interface adapter 3a, for exchanging data with memory 1b in a cycle stealing mode (via channel 1c and a not-shown direct access coupling to the memory); peripheral interface adapter elements 3b, 3c and 3d interfacing with device or device multiplexor 2 for repsectively exchanging data (in various formats), handshaking signals for timing data movements, and other control signals; a microprocessor 3e; a random access memory 3f accessible to microprocessor 3e; and bus 3g for transferring data between adapters 3a and 3b, a bus 3h for passing data and other information between subsystem 1 and microprocessor 3e via adapter 3a; a bus 3i connecting microprocessor 3e with storage 3f and adapters 3b, 3c and 3d; and lines 3j between adapters 3b and 3c for coordinating data transfer and handshake signalling operations therebetween. Subsystem 3 links to subsystem 1 and device 2 via external buses respectively indicated at 4 and 5.

In accordance with the present invention subsystem 3 is switched dynamically between two distinct modes of operation—high speed (HS) and programmable offline (PO) modes—in response to a dedicated mode bit in certain primary command descriptors termed "device control blocks" (hereafter DCB's). DCB's are prepared in memory 1b by primary subsystem software, are retrievable and interpretable by subsystem 3, and are linkable by chaining. Consequently, subsystem 3 may be programmed by means of chained DCB's to switch dynamically back and forth between HS and PO modes under conditions described herein.

With state-of-the-art integrated circuit packaging technology, subsystem 3 is packageable on a single multi-chip card, and is referred to in FIG. 1 and variously in this text as an "attachment feature card" or "attachment". It should be understood that to subsystem 1 attachment card 3 and device 2 are "viewable" as a single device address and that channel 1c is susceptible of attachment to plural such cards and other device controllers.

Adapter 3a and its interface busing 4 are described in U.S. Pat. No. 4,246,637. Adapter 3b and bus 3g are fully described in the above cross-referenced co-pending patent application by Heath Ser. No. 345,177. Adapters 3c, 3d and interface buses 5 are described in the above cross-referenced co-pending patent application by Andrews et al Ser. No. 345,129. The disclosures of these applications are hereby incorporated in this description.

Figure 2:
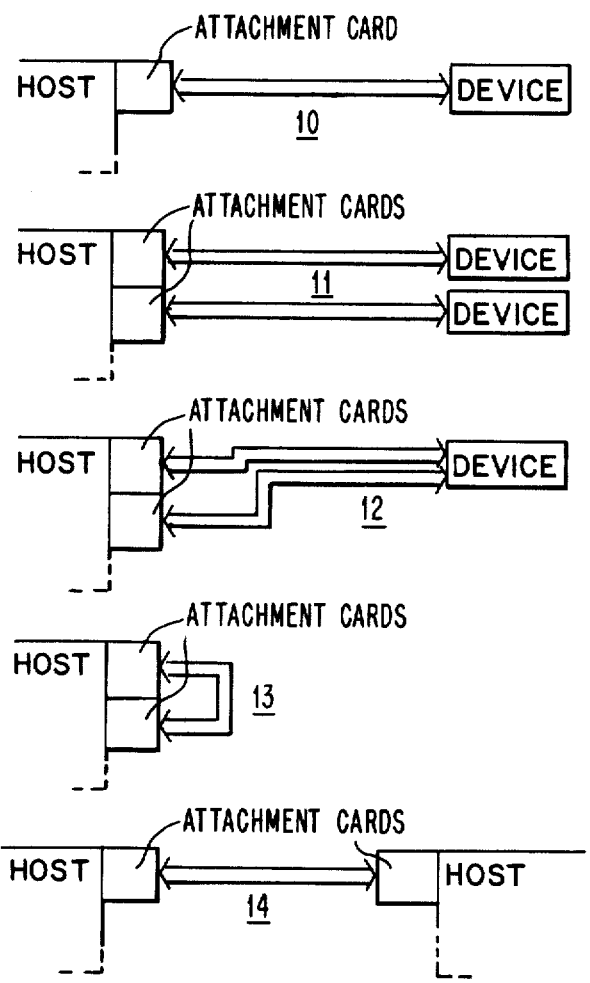
FIG. 2 provides a schematic view of various system configurations in which a secondary processing subsystem in accordance with the present invention may be used.

FIG. 2 illustrates various examples 10-14 of possible attachment usage configurations. Example 10 shows a single attachment card 3 linking a device such as 2 with a host subsystem such as 1 (through a not-shown host channel such as 1c, see FIG. 1). Example 11 shows two attachment cards separately attaching two devices to one host system (through separate not-shown subchannels of a not-shown host channel). Example 12 shows two attachment cards presenting an extended parallel data busing interface to a single device and linking that device to one host system. Example 13 shows two attachment cards linked to one host system for passing data between two subchannels of the system using a card-to-card tandem linkage described in the above cross-referenced co-pending patent application Ser. No. 345,129 by Andrews et al. Example 14 shows two attachment cards linking two separate and relatively asynchronous host systems via the just-mentioned tandem linkage configuration.

Figure 3:
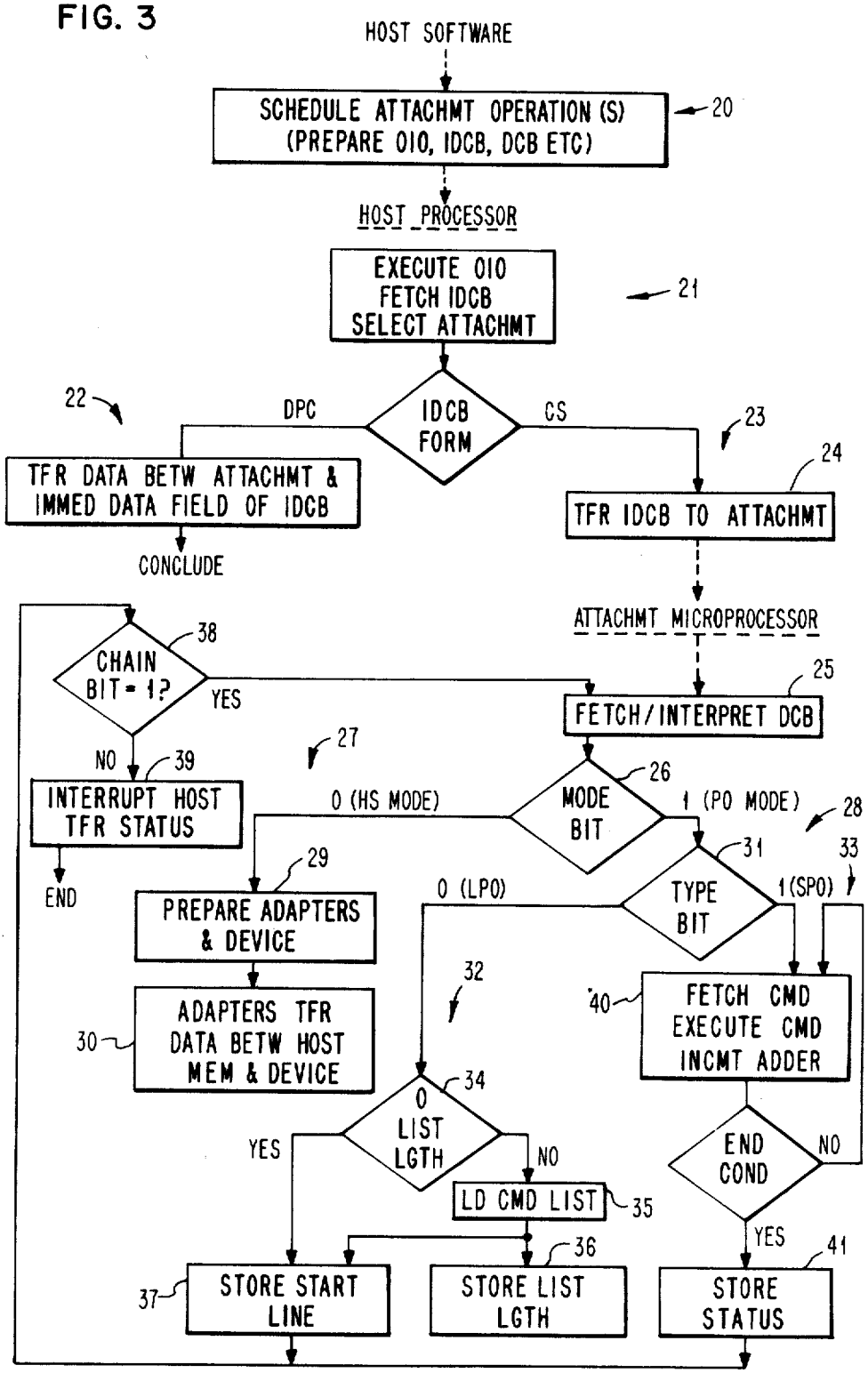
FIG. 3 is a functional flow diagram illustrating the operation of a system including a secondary subsystem in accordance with the present invention.

As explained above subsystem 3 operates alternately in high speed (HS) and programmable offline (PO) modes in response to a mode bit parameter contained in sequentially interpreted command descriptor arrays termed DCBs (Device Control Blocks). The processes by which such DCBs are prepared, fetched and interpreted are illustrated generally in FIGS. 3 and 4.

As suggested at 20 and 21, application software, operating on the host processor, schedules operations of devices including the subject attachment card by preparing an initiating instruction OIO (Operate I/O) and an "immediate" command descriptor IDCB (Immediate Device Control Block). At a suitable time 21 the host processor interprets the OIO instruction, and using address information in the instruction, retrieves the IDCB. The IDCB specifies a device address (in this instance the address of the attachment card) and an IDCB command function This command function specifies either a DPC (Direct Program Controlled) operation 22 or a CS (Cycle-Steal) operation 23.

While interpreting the IDCB the host processor instigates selection of the attachment card and branches on the command function. If DPC operation is specified the host processor and attachment card interact synchronously to conduct a data transfer 22 between microprocessor storage on the attachment card and an "immediate date field" portion of the IDCB. This transfer requires the host processor and attachment microprocessor to directly control appropriate elements in respective subsystems; for steering the immediate data to or from the channel/attachment interface on the host side and through the host interface adapter from or to microprocessor storage on the attachment side. If a CS operation is defined by the IDCB a copy of the IDCB is transferred to microprocessor storage on the attachment card, as suggested at 24, and thereafter the attachment card microprocessor uses IDCB information to condition host adapter 3a (FIG. 1) to perform a "cycle-steal write" transfer of a DCB (Device Control Block) command descriptor from host storage to attachment microprocessor storage. The DCB—consisting of eight 16-bit words described later—directs the microprocessor and attachment subsystem to perform additional operations. Retrieval and interpretation of the DCB are suggested at 25 in FIG. 3.

MODE SELECTION

To this point, the operations described above are conventional "prior art" functions traditionally performed by IBM Series/1 processing systems and I/O controllers pre-dating the present invention. Such operations have been disclosed, for instance in the above-referenced U.S. Pat. No. 4,246,637 to Brown et al. However, in the present instance, the DCB contains mode setting and chaining bit parameters which invoke varied modes of attachment operation presently considered unique and novel.

Branching on the condition of the just-mentioned mode bit in the DCB (decision 26, FIG. 3) the attachment microprocessor instigates a sequence of attachment subsystem operations in either a high speed (HS) mode 27 or a programmable offline (PO) mode 28. In HS mode the microprocessor selects its attached device 2 (which, relative to the primary subsystem, has the same device address as the attachment card), and prepares host interface adapters 3a and 3b and device 2 (operation 29) to conduct a data transfer (having a byte count length specified in the DCB) between host memory and device 2 (operation 30). In such transfers the data traverses interface 5 in one of several bit-parallel formats specified by the DCB, and is appropriately converted by adapter 3b to a format compatible with a fixed busing configuration at the host adaption interface. This type of operation, conducted by the adapters in asynchronous relation to contemporary operations of the host processor and attachment microprocessor, is described in the above cross-referenced application by Heath Ser. No. 345,177

In PO mode (which is described in the above cross-referenced patent application by Heath et al, Ser. No. 345,101 the attachment microprocessor branches on a presently unique "type bit" in the DCB (decision 31, FIG. 3) to perform either a "command list" preparation operation 32 or a program of operations 33 defined by "secondary commands" contained in a previously prepared command list. When the type bit value is 0 the DCB is termed a "Load Programmable Offline" (LPO) mode type DCB, and when the type bit is 1 the DCB is termed a "Start Programmable Offline" (SPO) mode type DCB.

3 DCB INTERPRETATION, LPO TYPE—GENERAL

When interpreting an LPO type DCB the attachment microprocessor branches at 34 on the value of a 4-bit list length factor contained in that DCB. If this value is other than 0000 the microprocessor conditions adapter 3a to retrieve a "command list" array, from an area of host memory effectively defined by boundary address information contained in the DCB in combination with a list length factor contained in the DCB. The microprocessor loads this command list array into a preassigned area of microprocessor storage, as suggested at 35. The loaded array contains a variable number of 16-bit "secondary" command words (DCBs presently are referred to as primary commands and commands in a command list are termed secondary commands). Preserving list length and starting line factors contained in this DCB, as suggested at 36 and 37, the microprocessor now branches at 38 on the value of the chaining bit contained in the DCB. If the chaining bit is 0 (chaining not specified) the microprocessor posts a status interruption to the host system, as suggested at 39, and concludes the current sequence of attachment subsystem operations. If the chaining bit is a 1 (chaining specified) the microprocessor and adapter 3a cooperatively retrieve another DCB and sequence through another series of operations conditional on the value of the mode bit in that DCB. When an LPO type DCB contains a 0000 list length factor the microprocessor takes the "YES" branch at decision step 34. It thereby skips command list loading step 35, but preserves new DCB start line information 37, and then takes chaining branch 38.

4 DCB INTERPRETATION, SPO TYPE—GENERAL

When interpreting an SPO type DCB (sequence 33, FIG. 3) the microprocessor uses the start line information preserved at 37, as an initial "command address", for entering a command list previously stored in microprocessor storage, and performs a program of operations defined by a series of secondary commands in said list beginning at the initial address. The microprocessor repeatedly retrieves a command at the command address, performs a function defined by the command, and increments the command address until it encounters one of several "ending conditions" explained later. This sequence is shown at 40. When the ending condition is encountered the microprocessor stores status as suggested at 41, and takes chaining bit branch 38.

5 LOGICAL SEQUENCE OF I/O INITIATION

Figure 4:
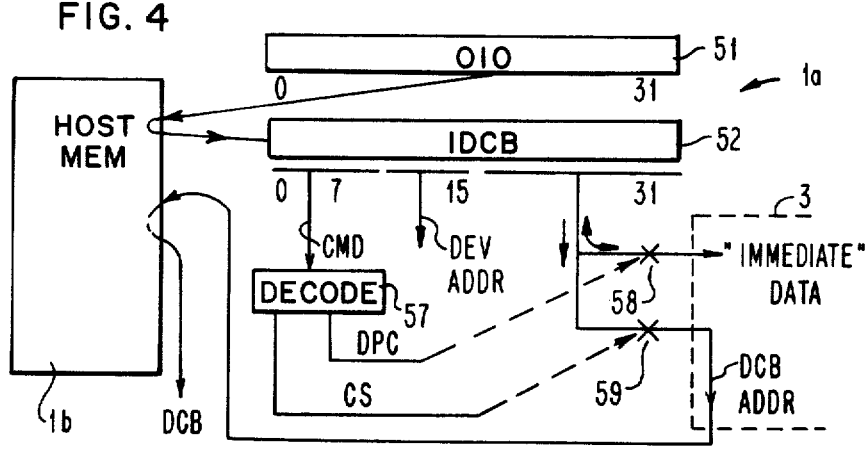
FIG. 4 illustrates a process by which primary command information is prepared by a primary subsystem and supplied to a secondary subsystem for initiating operations of the present invention.
Figure 5:
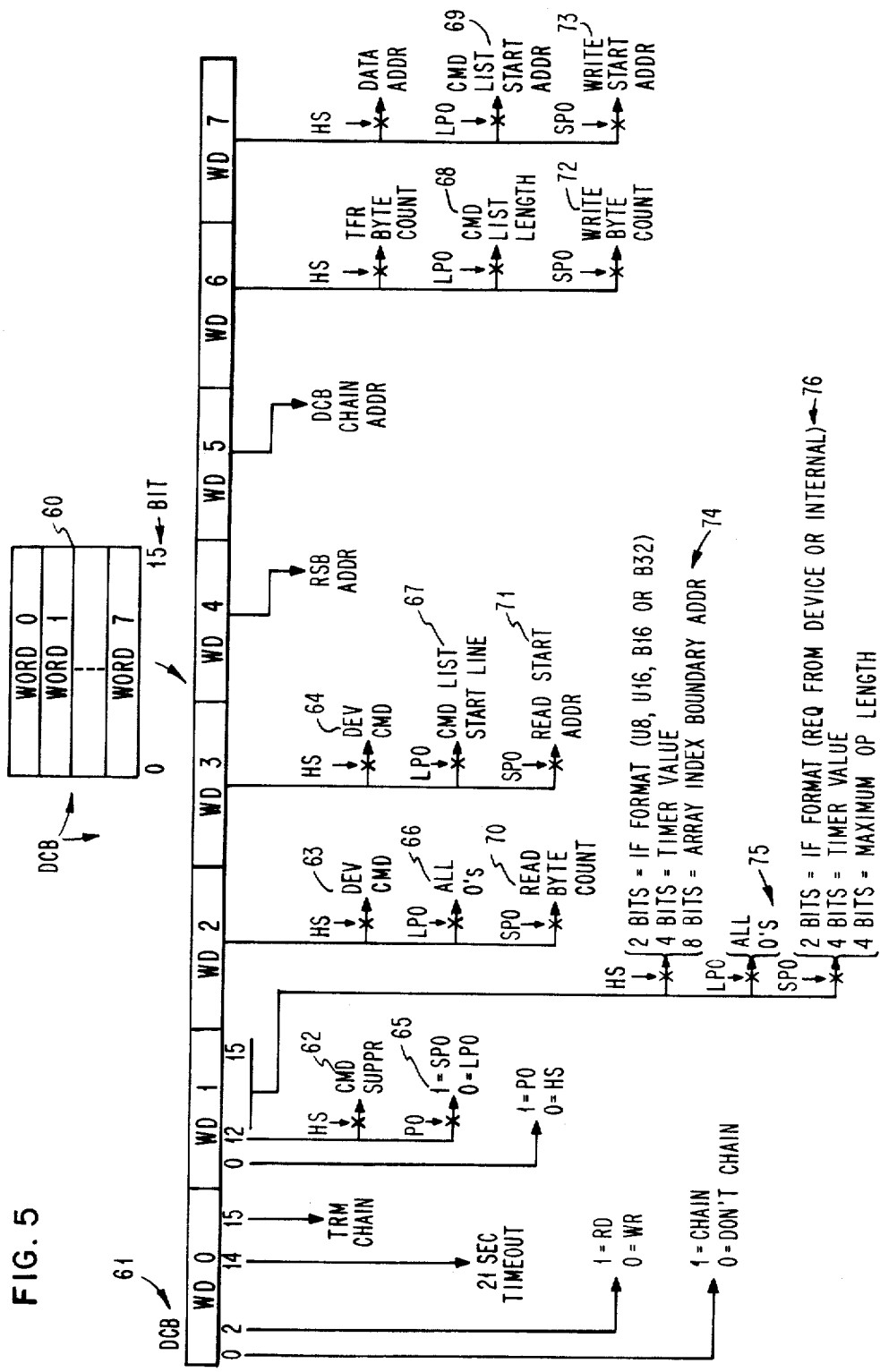
FIG. 5 illustrates the form and logical utilization of various types of primary commands in accordance with the present invention.

For the sake of clarity, FIGS. 4 and 5 indicate the logical organization of the system formed by the host and attachment subsystems in respect to performance of the foregoing operations. As shown at 51 and 52 in FIG. 4, the OIO instruction and the IDCB descriptor are double-word (32-bit) expressions. The OIO, which is handled only by the host processor, contains the effective address in host storage of the IDCB as suggested at 53. As previously explained, the IDCB evokes a coordinated information transfer between the host and attachment subsystems in either a DPC or CS mode. The IDCB contains a command defining portion 54, a device (address) identifying portion (in this instance defining the address of the attachment card), and a portion 56 having a variable context depending on the information in the command portion. Decoding logic 57 in the host subsystem examines the command portion and sets up either a DPC transfer operation through "switch path" 58 or a CS transfer operation through switch path 59.

In the present instance, the device address portion 55 is used by the host subsystem to select the attachment card. In a DPC transfer, field portion 56 of the IDCB constitutes an "immediate data field", which represents either a source or destination of immediate data to be set to or received from attachment microprocessor storage. In a CS transfer, address information contained in portion 56 defines the boundary address in host storage of the first word of an 8-word (128-bit) DCB descriptor. This information passes to the attachment card (suggested in dotted outline at 3), which thereafter operates on an asynchronous basis to retrieve the associated DCB. DCB FORMATS—GENERAL As shown at 60 and 61 in FIG. 5, a DCB descriptor in accordance with the present invention comprises an eight-word expression having words individually designated as words 0 through 7 (abbreviated WD0, WD1, etc.). Each word contains 16 bits, designated bits 0 through 15. Word 0 contains the chaining bit (WD 0, bit 0), and other information defined below. Word 1 bit 0 contains the mode defining bit (designating HS or PO mode). Other bits in word 1, bit 2 of word 0 and all bits of words 2, 3, 6 and 7, have varied contexts of interpretation explained below, dependent on the value of the mode bit. Word 4 contains the beginning address in host storage of an 8-word area for storage of "residual status block" (RSB) information defined below. Word 5 defines a chaining address which is used when the sequence of operations for interpreting this DCB concludes and the chaining bit of this DCB specifies chaining (word 0, bit 0=1).

FIG. 5 provides an overview of the definitions and logical effects of certain key parts of the DCB. All of the DCB elements are more completely defined below.

Referring to FIG. 5, when the mode bit specifies HS mode (word 1, bit 0=0) the second bit of word 1 (word 1 bit 1) defines a command suppress function indicated at 62 (if this bit is 0 a "device directed command" function contained in words 2 and 3, and indicated at 63 and 64, is transferred by the attachment subsystem to the device, but if this bit is 1 this command transfer is suppressed). When PO mode is specified (word 1 bit 0=1) the second bit of word 1 distinguishes command type, as suggested at 65 (type LPO if the bit is 0, type SPO if it is a 1).

If HS operation is specified bit 2 of word 0 defines a transfer of data in one of two directions, from the device to host storage (a "READ" transfer) if this bit is a 1, or from host storage to the device (a "WRITE" transfer) if this bit is a 0. This transfer is performed by adapters 3a and 3b (FIG. 1) without microprocessor interference, and without intermediate storage of data in microprocessor storage. The amount of data transferred in this mode is specified by a transfer byte count contained in DCB word 6.

If PO mode is defined, the meaning of word 0 bit 2 depends on the value of the type bit (word 1 bit 1). If LPO type is specified word 0 bit 2 must be 0 (in effect associating with a "write" transfer of a command list from host storage to microprocessor storage; refer to operation 35, FIG. 3). However, if SPO type is defined word 0 bit 2 must be 0, and may have a dual directional context explained later under "dual mode operation". In respect to this context, when SPO type is specified plural data transfer operations may be conducted intermittently between the attachment and plural areas of host storage under the direction of certain secondary (command list) commands specifying read and write transfer operations.

When PO mode and LPO type are specified word 2 is idle (by convention set to all 0's), as suggested at 66, and words 3, 6 and 7 respectively contain "start line", "list length" and "start address" parameters suggested respectively at 67, 68 and 69. If length 68, defined by word 6, has a value other than 0000 (hexadecimal), address 69 defines the beginning of an area in host storage containing a command list which is to be transferred to (loaded into) microprocessor storage. In this case, address 69 and length factor 68 are used to access the list area in host storage and carry out the transfer one command at a time (operation 35, FIG. 3). The start line factor 67 is used by the attachment microprocessor to determine a command line position, within the (loaded) command list at which processing of secondary commands is to begin when the microprocessor subsequently operates under direction of an SPO type DCB. If the list length value is 0000 (Hex), certain parts of the DCB (the start line and list length factors) are preserved in microprocessor storage, for effectively enabling the microprocessor to access a list loaded under the direction of a previously interpreted LPO type DCB, but the LPO type DCB immediately being interpreted is not used for transferring a command list to microprocessor storage.

When PO mode and SPO type are specified, word 2 of the DCB represents a "read byte count" 70, word 3 defines a "read start address" 71, word 6 defines a "write byte count" 72 and word 7 defines a "write start address" 73. The read start address and byte count effectively define an area in host storage into which data may be transferred from the attachment (by operation of certain secondary commands contained in a command list currently resident in microprocessor storage), and the write start address and write byte count functions define another area in host storage (usually, but not necessarily, separate from the read area) from which data is to be extracted for transfer to the attachment under the direction of certain write commands in the currently resident command list.

When HS mode is specified, bits 2-15 in DCB word 1 have contexts indicated at 74. Two of these bits are used to specify one of four device interface formats, for the associated data transfer (these formats being defined below and described in the above cross-referenced patent application—Ser. No. 345,177 by Heath). Four of these bits define one of 16 timer waveforms selected from a timer source described in the above cross-referenced patent application by Andrews et al Ser. No. 345,129. The remaining bits define the location in host storage of an array indexing factor to be used when a certain device interface format (B16) and an associated array indexing operation are specified (these formats and array indexing are described in said Heath application Ser. No. 345,177 (in array indexing, the microprocessor and adapters 3a, 3b operate in coordination to transfer address information from the microprocessor to the device and certain "array data" between host storage and the device).

When PO mode is specified bits 2-15 in word 1 are all 0's if the DCB is LPO type. However, if the DCB is SPO type, these bits are used to define one of several handshaking formats (for the device interface), one of 16 timer waveforms (similar to the times defined for HS operation) and a maximum operation length parameter indicating the maximum number of secondary commands which may be executed under the direction of the respective DCB.

These DCB definitions are specified in more specific detail as follows:

HS MODE (WORD 1, BIT 0=0)

This mode permits rapid transfer of data between the attached device and host storage, without microprocessor or host processor assistance and without storage of the data intermediately in microprocessor storage. The amount of data transferred is specified in word 6. The word portions of this DCB have the following meanings (for attachment subsystem interpretation).

DCB WORD 0 (CONTROL WORD)

Bit 0—Chaining flag. When this bit is a 1, the attachment performs a chaining procedure. The attachment completes the current operation, but does not send an interrupt request to the host processor. Instead, the attachment fetches the next DCB in the chain and performs the next operation. (DCB word 5 indicates the location of the next DCB). Chaining continues until the attachment fetches a DCB that has a chaining flag set to 0, thus indicating the last operation in the chain.

If the suppress exception bit (bit 4) is a 1, a residual status block (RSB) is stored for each operation in the chain, unless an exception interrupt is reported. An exception interrupt also terminates a chain. (Refer to the explanation of bit 4.)

Bit 1—Program-controlled interrupt. When this bit is a 1, a program-controlled interrupt is posted upon completion of the DCB fetch. (Each such interrupt must be attended to by the host system before another interrupt can be posted by the secondary subsystem.)

Bit 2—Input flag. For this (HS) mode this bit indicates which direction data is to be transferred. When this bit is a 1, the attachment transfers data to processor storage; when this bit is a 0, data is transferred from processor storage to the attachment.

Bit 3—This bit is not used in this operation; it must be a 0.

Bit 4—Suppress exception. When this bit is a 1:
  Exceptions in length which would otherwise cause an exception interrupt are reported as permissive device end.
  The status of the attachment is stored at the address specified by the residual status block address (DCB word 4), unless an exception interrupt is reported.
A residual status block (RSB) is posted at the end of each operation that is programmed for suppress exception. The format of the RSB is discussed below under "Residual Status Block".

Bits 5-7—Address key. This is a three-bit key that the attachment presents during data transfer to verify that the program has authorization to access processor storage. An incorrect address key causes an exception interrupt.

Bits 8-10—These three bits are not used in this operation; they must be 0's.

Bits 11-13—Program-controlled interrupt ID. These three bits are presented as bits 3, 4, and 5 of an Interrupt Information byte (IIB) explained later, during a following program-controlled interrupt. (All other bits in the IIB are 0's.)

Bit 14—21-second time-out. When this bit is a 1, it activates a 21-second time-out on the DCB operation. The attachment must either chain or interrupt within 21 seconds; otherwise, an exception interrupt is reported, and bit 9 of cycle-steal status word 3 is set to 1.

When this bit is 0, the time-out is not used.

Bit 15—Terminate chaining. When this bit is a 1, in conjunction with bits 0 and 4 set to 1's, the attachment suppresses exceptions in length. However, it terminates chaining operations when a short exception in length is encountered (that is, the data that is transferred is less than the byte count specified in word 6).

When this bit is a 1 and either bit 0 or bit 4 is a 0, the attachment reports a DCB specification check.

When this bit is a 0 and bit 4 is a 1, the attachment continues chaining despite short exceptions in length.

DCB WORD 1—ATTACHMENT-DIRECTED COMMAND

With bit 0 of this word set to 0, this word defines an HS mode operation to the attachment with certain designated options. The word defines: the mode of operation (high-speed DI/DO), whether (command) words 2 and 3 are to be transferred to the device, and what data format and timing pulse period are to be used.

Bit 0—DI/DO definition. This bit is set to 0 to define HS (high-speed DI/DO) mode operation.

Bit 1—Command suppress. If this bit is a 0, the command words given in DCB words 2 and 3 are delivered to the device. If this bit is a 1, delivery of the command words to the device is suppressed.

Bits 2, 3—Format. These bits define the format of the attachment interface:

| Bits 2, 3 | Interface format |
|---|---|
| 00 | 8 bits, unidirectional (U8) |
| 01 | 16 bits, unidirectional (U16) |
| 10 | 16 bits, bidirectional (B16) |
| 11 | 32 bits, bidirectional (B32) |

(For information about these formats and the attachment-device interface, refer to above-referenced copending application Ser. Nos. 345,177 and 345,129.)

Bits 4–7—Timer value. These bits designate the timer output period to be used (refer to application Ser. No. 345,129 above, for information timer usage).

| Bits 4-7 | Timer output |
|---|---|
| 0000 | No transitions |
| 0001 | 10.4 usec pulse* |
| 0010 | 10.4 usec |
| 0011 | 20.8 usec |
| 0100 | 41.6 usec |
| 0101 | 83.3 usec |
| 0110 | 166.6 usec |
| 0111 | 333.3 usec |
| 1000 | 666.6 usec |
| 1001 | 1.333 msec |
| 1010 | 2.666 msec |
| 1011 | 5.333 msec |
| 1100 | 10.66 msec |
| 1101 | 21.33 msec |
| 1110 | 42.66 msec |
| 1111 | 85.33 msec |

*0001 causes a single pulse; all other options cause a continuously repetitive signal.

Bits 8–15—Array index boundary (port 0 counter preset). When in 16-bit bidirectional format, this field is set into the high-order byte of the bus not used for data transfer. The low-order byte is set to hex 00. Together, the two bytes form an array index expression whose use is described in application Ser. No. 345,177 referenced above.

Formats other than 16-bit bidirectional must have bits 8–15 set to hex 00; otherwise the attachment posts a DCB specification check.

DCB Words 2 and 3—Device-Directed Command: DCB words 2 and 3 together comprise a 32-bit command that is delivered to the device, unless delivery is suppressed by a 1 in bit 1 of word 1. All 32 bits in the command are delivered, according to the format designated in bits 2 and 3 of word 1:

If the interface is 32 bits wide, word 2 is the most-significant word and word 3 is the least-significant word. Both words are presented simultaneously on the device interface as a single outbound command transfer.

If the interface is 16 bits wide, word 2 is presented first and then word 3 is presented, as two separate sequential transfers.

Note: If only a 16-bit command is required, words 2 and 3 may be made identical and then stored into a single 16-bit register in the device logic.

If the interface is eight bits wide, four sequential transfers are made:
1. Bits 0–7 of word 2
2. Bits 8–15 of word 2
3. Bits 0–7 of word 3
4. Bits 8–15 of word 3

Data transfers between the device and the attachment card occur after command delivery is completed.

DCB Word 4—Residual Status Block Address: This word contains the beginning address of an eight-word area in host storage where the residual status block (RSB) is to be stored. The address must be even; thus bit 15 must be a 0.

An RSB is stored whenever the suppress exception bit (bit 4) in word 0 is a 1 and an exception interrupt is not reported. The format of the RSB is discussed below under "Residual Status Block".

DCB Word 5—DCB Chain Address: This word specifies the host main-storage address of the next DCB to be executed if the chaining flag (bit 0) of DCB word 0 is a 1. The DCB chain address must be even (bit 15 is a 0); if it is odd, an interrupt is posted and the DCB specification check bit (bit 3) in the ISB is set to 1. If an error occurs, condition code 2 (exception) is reported and chaining stops.

DCB Word 6—Byte Count: This word contains a 16-bit unsigned integer representing the number of data bytes to be transferred for the current DCB. The byte count may be specified through the entire 16-bit range of 0 through 65,535. However, partial transfers are not allowed; so the byte count must be a multiple of the formatted width of the device interface, as specified by bits 2 and 3 in word 1.

If the byte count is greater than the maximum allowed for a particular operation, or if the byte count is odd for 16-bit or 32-bit formats, the DCB specification check bit (bit 3) in the ISB is set to 1. When the interrupt request is accepted, condition code 2 (exception) is reported.

DCB Word 7—Data Address: This word contains the starting address in host main storage for the data associated with the operation to be performed. The data address must be even (bit 15 is a 0) for 16-bit and 32-bit formats, but it may be odd for 8-bit unidirectional format.

If the data address is odd for a 16-bit or 32-bit format, an interrupt request is posted and the DCB specification check bit (bit 3) in the ISB is set to 1. When the interrupt request is accepted, condition code 2 (exception) is reported.

8 PO MODE

8.1 PO MODE, LPO TYPE

Used to load the command list and an initial line access parameter for use during operation under a subsequent SPO type DCB.

DCB WORD 0—CONTROL WORD

Bit 0—Chaining flag. Same context as in HS mode DCB

Bit 1—Program-controlled interrupt. Same as for HS mode.

Bit 2—Input flag. This bit indicates which direction data is to be transferred. Because data (i.e. command list) transfer for this type of operation is always from host storage to the attachment, this bit must be a 0. Otherwise, a DCB specification check will result.

Bit 3—This bit is not used in this operation; it must be a 0.

Bit 4—Suppress checksum non-compare. The attachment always transfers and checks the checksum (the last word of the command list). When bit 4 is set to 1, checksum non-compare exceptions do not result in exception interrupts. However, the checksum error status is set, and the residual status block is stored at the address specified by the residual status block address (DCB word 4), if an exception interrupt is not reported.

Note: This bit does not suppress interrupts caused by exceptions in length. Nor does it cause retries to occur when checksum non-compare exception interrupts are suppressed.

Bit 5-7—Address key. Same as HS mode.

Bits 8-10—These three bits are not used in this operation; they must be 0's.

Bits 11-13—Program-controlled interrupt ID. Serves as HS mode.

Bit 14—21-second time-out. This bit must be a 1. It activates a 21-second time-out on the DCB operation. The attachment must either chain or interrupt within 21 seconds, or an exception interrupt is reported.

Bit 15—Terminate chaining. This bit must be a 0.

DCB WORD 1—Attachment-Directed Command

This attachment-directed command word specifies a load programmable offline mode (LPO) type operation.

Bit 0 This bit is a 1 for all PO mode operations.

Bit 1 This bit is a 0 for LPO type operation.

Bits 2-15 These bits are reserved; they must be 0's.

DCB Word 2—Reserved: this word is reserved; it must be all 0's.

DCB Word 3—Command List Start Line: this word designates the command list line where the attachment should begin processing secondary (command list) commands when it next interprets a start programmable offline word (SPO) type DCB. This word must be less than hex 0700.

Note: The first line of a command list is line 0000. Thus, if in this LPO type a DCB word 3 is 0000, the attachment begins processing at the first line of the command list; and if DCB word 3 is 0001, the attachment begins processing at the second line.

This word is often used when a process has been interrupted in a previous operation and is being restarted at the next sequential command list line. (Refer to DCB word 6.)

DCB Word 4—Residual Status Block (RSB) Address: Same definition as for HS mode.

DCB Word 5—DCB Chain Address: Same as HS.

DCB Word 6—Command List Length: This word contains a 16-bit unsigned integer representing the length (in bytes) of the command list plus the two-byte checksum. If word 6 is 0000 and a command list has previously been loaded, the attachment restarts the command list program after the next start programmable offline mode DCB is accepted. In this case, the command list program restarts at the line indicated in DCB word 3. Command list programs may be restarted by this method. If no command list has previously been loaded, the attachment reports device end interrupt and sets bit 10 in cycle-steal status word 3 to a 1. The command list checksum is not rechecked when the byte count is 0000.

If this word is non-zero, the attachment clears the I/O registers, accumulators, working registers, and processor status, and reads the command list into microprocessor storage until the byte count is exhausted. The byte count must be even and may not exceed hex 0E02 bytes. (Because commands are two bytes, the maximum command list length is 1792 commands plus 2 bytes for the checksum word).

If the byte count is 0002 (Hex) the command list is considered to be zero-length with a two-byte checksum. In this case the attachment will effectively clear its local command list storage area so that any subsequent SPO type DCB will be denied access to the last loaded list. This permits any application program using PO mode to restrict access of other application programs to its command list (e.g. as a security measure).

DCB Word 7—Command List Start Address: This word contains the starting address of the command list in host storage. Because commands are two bytes, this word must be even (bit 15 is a 0). The command list, as resident in host storage, is shown in FIG. 6. The checksum contained in the last two bytes of the list is supposed to equal the number of commands plus 2.

8.2 PO MODE SPO TYPE

Used to start microprocessor processing of a sequence of secondary commands contained in a preloaded command list.

DCB Word 0—Control Word:

Bit 0 Chaining flag. Same as for HS.

Bit 1 Program-controlled interrupt. Same as HS.

Bit 2 Input flag. For this DCB, this bit must be a 1. This DCB is used to invoke execution of a series of command list commands which may direct data transfers both to and from host storage (see "Dual Mode Applications" below).

Bit 3 This bit is not used and must be 0.

Bit 4 Suppress exception. Same as HS.

Bits 5-7 Same as HS.

Bits 8-10 These bits are reserved and must be 0's. Otherwise, a DCB specification check will result.

Bits 11-13 Program-controlled interrupt ID. Same as HS.

Bit 14 21-second time-out. When this bit is a 1, it causes a programmable offline mode I/O operation to terminate 21 seconds after the operation is started, if it has not already terminated. Status is then returned to the command list program that a time-out has occurred. When this bit is a 0, the time-out is not used.

Bit 15 Terminate chaining (short exceptions in length).
When this bit is a 1, in conjunction with bits 0 and 4 set to 1's, the attachment suppresses exceptions in length. However, it terminates chaining operations when a short exception in length is encountered (that is, the data that is transferred is less than the byte count specified in word 2 or word 6 of the start programmable offline mode DCB).
When this bit is a 1 and either bit 0 or bit 4 is a 0, the attachment reports a DCB specification check.
When this bit is a 0, the attachment continues chaining despite exceptions in length.

DCB Word 1—Attachment-Directed Command

This attachment-directed command word specifies that start programmable offline (SPO) mode type operation, with designated options, is to be performed. The word defines the mode of operation (start programmable offline mode), and the interface handshaking and timing.

Bit 0 This bit is a 1 for all PO mode operations.
Bit 1 This bit is a 1 for SPO type operation.
Bits 2, 3 Handshake. These bits define the hand-shaking configuration of the interface. Bit 2 controls bus 1; bit 3 control bus 0. Coding is as follows:
1 = device request (device controls transfers)
If either bit is a 1, data transfers on the bus controlled by that bit are initiated by a request from the device. Command processing halts pending programmable offline mode I/O transfers.
0 = internal request (attachment controls transfers)
If either bit is a 0, no request is required from the device for that bus.
Bits 4—7 Timer value. Same as for HS.
Bits 8-11 Operation length. This field contains a code that designates the maximum permissible operation length, that is, the number of secondary (command list) I/O commands that may be performed as a result of a single SPO type DCB. If the designated maximum is exceeded, the program terminates with a device end interrupt, and bit 11 in cycle-steal status word 3 is set to 1.

| Bits | Operation length | |
|------|------|---------|
| 8-11 | Hex | Decimal |
| 0000 | 1 | 1 |
| 0001 | 2 | 2 |
| 0010 | 4 | 4 |
| 0011 | 8 | 8 |
| 0100 | 10 | 16 |
| 0101 | 20 | 32 |
| 0110 | 40 | 64 |
| 0111 | 80 | 128 |
| 1000 | 100 | 256 |
| 1001 | 200 | 512 |
| 1010 | 400 | 1024 |
| 1011 | 800 | 2048 |
| 1100 | 1000 | 4096 |
| 1101 | 2000 | 8192 |
| 1110 | 4000 | 16384 |
| 1111 | 8000 | 32768 |

Note: While this parameter is intended as a terminating default condition, any length operation may be achieved by chaining multiple DCBs so that each succeeding DCB restarts the command code of the preceding DCB. For example:

| First DCB operation length | 512 |
|---|---|
| Second DCB operation length | 128 |
| total operation length | 640 |

As many DCBs as are needed may be chained to achieve the desired total.

A command list program that terminates as a result of the operation length being exceeded may be restarted by using the restart feature of LPO (DCB word 3).

Bits 12-15 This field must be all 0's, or a DCB specification check will result.

DCB Word 2—Read Byte Count: (See "Dual Mode Applications" below.) This word indicates the number of data bytes to be transferred into host storage by the current DCB. Each secondary command transferring data to host storage decrements the indicated byte count. When the byte count reaches 0000, data transfer with the host stops. This word must be even, or a DCB specification check will result.

DCB Word 3—Read Start Address: (See "Dual Mode Applications.) This word contains the starting address in host storage into which data is to be stored. This word must be even, or a DCB specification check will result.

DCB Word 4—Residual Status Block Address: Same as HS.

DCB Word 5—DCB Chain Address: Same as HS.

DCB Word 6—Write Byte Count: (See "Dual Mode Applications".) This word indicates the number of data bytes to be transferred from host storage by the current DCB. Each secondary command transferring data out of host storage decrements the indicated byte count. When the byte count reaches 0000, data transfer stops. This word must be even.

DCB Word 7—Write Start Address: (See "Dual Mode Applications".) This word contains the starting address in host storage from which data is to be written. This word must be even.

Note: The read and write areas in host storage may (but need not) overlap. This allows an area in main storage to be reused by the attachment. However, only sequential access in ascending order is allowed.

INTERRUPT STATUS INFORMATION 9.1 INTERRUPUT ID WORD

When presenting a priority interrupt, the attachment also transfers an interrupt ID word to the host processor. The interrupt ID word contains the device (i.e. attachment) address and an "interrupt information byte" (IIB). The IIB is transferred to the host processor on attention or device end interrupts. The IIB on attention interrupts contains all 0's. On device end interrupts, a 1 in bit 0 (permissive device end bit) indicates that "soft" error information is available in the residual status block (RSB).

Note: For a chained operation, a 1 in bit 0 indicates that at least one of the stored RSBs contains "soft" error information.

A "soft" error is a suppress exception that sets IIB bit 0 to 1 when suppress exception (bit 4 in DCB word 0) is set to 1.

For interrupt condition code 2 (exception) or 6 (attention and exception), the IIB has a special format and is called the interrupt status byte (ISB). Multiple ISB bits may be set on at one time. The ISB bits, when set to 1, give the following indications:

Bit 0—Device Dependent Status Available: Indicates that further attachment status information is available in a cycle-steal status block.

Bit 1—Delayed Command Reject: Indicates that there is an incorrect parameter, such as an odd byte DCB address or an incorrect function in the IDCB. This bit is also set to 1 if the IDCB specifies a DPC function not in the attachment's repertoire.

Bit 2—Incorrect-Length Record: Indicates that the attachment encountered a mismatch between the byte count specified in DCB word 6 (or DCB word 2 for a start programmable offline mode DCB) and the length of the record read or written on the device interface. (Refer to "Residual Status Block" below for an explanation of incorrect-length record processing during suppress exception.)

Bit 3—DCB Specification Check: Indicates that an invalid parameter, which prevented proper execution of the command, was found in the DCB. This could reside in any part of the DCB. The residual address in cycle-steal status word 0 points to the last byte of the word in which the bad parameter was found. When this bit is set to 1, bit 0 is also set to 1.

Bit 4—Storage Data Check: Indicates that the host storage location accessed during a cycle-steal output operation contained a parity error. The parity in storage is not corrected and no machine check condition occurs. The operation terminates immediately.

Bit 5—Invalid Storage Address: Indicates that a host storage address to which access was attempted during a cycle-steal operation exceeds the storage size of the processor. The operation terminates immediately.

Bit 6—Protect Check: Indicates that the attachment attempted to access a host storage location without a correct key. The operation terminates immediately.

Bit 7—Interface Data Check: Indicates that a parity error was detected on the device interface during a cycle-steal data transfer. The operation terminates immediately.

The following errors cause an exception interrupt:
A 21-second time-out occurred during the operation.
An attachment parity error occurred.
An equipment check occurred.
An incorrect-length record transfer occurred, unless suppress exception (DCB word 0 bit 4) was set to 1.
A condition was encountered during programmable offline mode that caused an exception under an offline control code command.
A BASE or any jump instruction in programmable offline mode specified an address outside the boundaries of the command list.
A loss of synchronization occurred in device handshake. For example, the device requested a second transfer before the attachment (or the channel) could service the first request.
The 'ready' line on the device interface had a transition to the not-ready state.
A DCB specification check was reported.

9.2 RESIDUAL STATUS BLOCK (RSB)

When the suppress excpetion bit (bit 4 of DCB word 0) is set to 1 and an exception interrupt is not reported, a residual status block (RSB) is stored at the host storage address specified in DCB word 4. During chaining, an RSB is stored for each DCB that is chained.

Incorrect-length records that are transferred are reported by a device-end interrupt with IIB bit 0 set to 1. The special interface counter may be connected to indicate the total number of transfers. The residual byte counts (RSB words 0 and 6) record the number of bytes not transferred on records that are less than the byte counts in DCB words 2 and 6.

The load programmable offline mode DCB also reports an RSB when a checksum error is suppressed and an exception interrupt is not reported.

Note: Values reported in the RSB for each DCB are sampled immediately after the DCB's operation is completed but before the termination interrupt is presented to the host.

The RSB contains eight words. Its format is:

Word 0—Residual Byte Count

This word contains the byte count, as specified in DCB word 6 of the last cycle-steal operation (write or read if unidirectional-format, write only if bidirectioan) minus the number of bytes successfully transferred.

Word 1—RSB Flags

This word has the following format:
Bit 0—End of chain (EOC). This bit is a 1 when bit 0 of DCB word 0 is a 0.
Bit 1—Retry (RT). This bit is not used and is always a 0.
Bits 2-7—Reserved. These bits are always 0's.
Bit 8—Write excess length (WEL). The length of the transfer on the device interface exceeds the byte count specified in the DCB.
Bit 9—Read excess length (REL). The length of the transfer on the device interface exceeds the byte count specified in the DCB.
Bits 10-13—Reserved. These bits are always 0's.
Bit 14—Incorrect-length record (ILR). This bit indicates that the record written to or read from the device is shorter or longer than the byte count specified in the DCB.
Bit 15—No error (NE). This bit is a summary of bits 8, 9 and 14. When When each of those bits is a 0, bit 15 is a 1.

Word 2—Residual Address

This word contains the host main storage address of the high-address byte (low-order odd byte) of the last cycle-steal write or read transfer attempted. The residual address may be a data address or a DCB address.

Word 3—Residual Attachment Status

The format of this word is identical to the format of cycle-steal status word 3. Bits 0-13 indicate the status accumulated during the DCB operation for which the RSB is reported. Bits 14 and 15 indicate the state of lines on the device interface taken at the end of the DCB operation.

Bit 0—Attachment parity check. Bad parity was received on the device interface (while parity operation was selected).
Note: This bit is always reported as a 0.
Bit 1—Cycle-steal status error. An error was detected during processing of the Start Cycle Steal Status command operation. Note: This bit is always reported as a 0.
Bit 2—Exceptional length transfer. The attachment did not transfer the entire length of the record(s). The number of transfers on the device interface exceeded the byte count.

Bit 3—Checksum error. A checksum comparison error occurred during command list loading.

Bit 4—Programmable offline mode process error. The command decoder was unable to process a command line.

Note: This bit is always reported as a 0.

Bit 5—Excessive length command list. The offline code command list length exceeded the command list length specified in the DCB.

Note: This bit is always reported as a 0.

Bit 6—Device error. The last operation terminated due to loss of the 'ready' line on the device interface, or a + transition occurred on the 'ready' line when the attachment was not busy. This bit is reported only after a load programmable offline mode DCB.

Bit 7—Equipment check. The attachment detected an internal malfunction, or a DCB for other than 16-bit bidirectional mode was received while the card-to-card option switch was set on.

Note: This bit is always reported as a 0.

Bit 8—Bidirectional data transfer. The last transfer was a bidirectional-DCB transfer.

bit 9—21-second time-out. DCB word 0 bit 14 was set to 1 and a time-out occurred because the attachment operation did not complete the data transfer within 21 seconds. This bit is reported only after a start programmable offline mode DCB.

Bit 10—Command list not stored. No command list is stored.

Bit 11—Operation length exceeded. The programmable offline mode operation length (designated by word 1) was exceeded.

Bit 12—Offline debug mode. The offline debug mode was on.

Bit 13—Interface overrun control sync loss. Interface request overrun caused a loss of control synchronization.

Note: This bit is always reported as a 0.

Bit 14—Device ready state. The inverse of the current device ready state (0=ready, 1=not ready). This bit is reported only after a load programmable offline mode DCB.

Bit 15—Device status. The state of the device status line on the interface.

Word 4—Last DCB Address

This word contains the starting address of the last DCB used by the attachment.

Word 5—Residual Address (Read for Bidirectional)

Following a Unidirectional Format DCB: This word contains all 0's.

Following a Bidirectional Format DCB: This word contains the host storage address of the high-address byte (low-order odd byte) of the last cycle-steal read transfer attempted.

Word 6—Residual Byte Count (Read for Bidirectional)

Following a Unidirectional Format DCB: This word contains all 0's.

Following a Bidirectional Format DCB: This word contains the byte count as it was specified in DCB word 2 of the last cycle-steal operation, minus the number of bytes successfully transferred.

Word 7—Special Interface Counter Value

This word specifies the number of events counted by the special interface counter (refer to application Ser. No. 345,129). If the special interface counter is used to count the total number of transfers to the attached device, this value minus the DCB byte count is the number of bytes that did not transfer on an incorrect record read of excessive length (overflow byte count).

The special interface counter is active at all times, and it is reset upon receipt of a valid Start command DCB.

In addition to this process for RSB generation, in the CS mode of IDCB handling discussed previously, a not-discussed specific IDCB form causes the attachment of a not-discussed special HS mode DCB which in turn causes the attachment to transfer a "Cycle Steal Status" (CSS) block as "Read" data to host storage. This CSS block includes all of the above RSB elements except the flags (RSB word 1). Instead the CSS provides a "Residual Command List Line" (RCLL) word which defines the command list line containing the secondary command whose execution was last attempted during a preceding SPO type DCB interpretation sequence. This permits the host system to involve recovery procedures with selective restart of command list execution at a position associated with the RCLL parameter (via a suitably programmed LPO type DCB). It also allows the host to identify a defective command associated with termination of an SPO type DCB command list execution with exception interrupt.

10 PO MODE SECONDARY COMMANDS

The command list format is indicated generally in FIG. 6. Command list processing, and (formats and functions of) specific secondary commands are defined below.

Programmable offline mode operation permits control of the device interface directly from the attachment's microprocessor at low to moderate speeds. This mode may also be operated independently, so that the attachment's microprocessor becomes a subordinate processor to the central processor of the host subsystem.

Control of the device interface is programmed through the host by loading a command list from host storage into attachment storage. The attachment recognizes 32 different commands. These commands can perform:

I/O data transfers
Internal data tranfers
Logical and arithmetic processing
Conditional branching
Card hardware control The I/O commands can transfer data on the device interface in 16-bit unidirectional format, and they can also cycle-steal data to and from host storage.

A maximum of 1792 commands (or 3584 bytes) may be loaded into the attachment. The command list is loaded into the attachment by using a load programmable offline model DCB. Then the offline operation is started by a start programmable offline mode DCB.

The line number in a command list where processing is to begin is placed in word 3 of the load programmable offline mode DCB. The address in host storage of command list line 0 is placed in word 7 of that same DCB, and the length (in bytes) of the command list +2 (two-byte checksum) is placed in word 6. When the load programmable offline mode DCB is issued, the command list is transferred to the attachment and verified using the checksum. The format of the command list, as resident in host storage, is shown in FIG. 6.

The attachment begins processing a command list program when a start programmable offline mode DCB is issued. The program starts at the command list line indicated in DCB word 3 of the load programmable offline mode DCB.

A command list must be loaded before a start programmable offline mode DCB is issued. Otherwise, processing stops immediately, with an exception interrupt and cycle-steal status indicating that no command list program has been loaded. Once loaded, a command list program may be restarted repeatedly by a new SPO type PO mode DCB.

Command list program processing terminates when any one of the following occurs:
  A command evokes an interruption of the host processor.
  An exception condition occurs.
  The 'op end' line on the device interface is set active.
  The operation length limit specified in the start programmable offline mode DCB is exceeded.

10.1 COMMAND FORMATS (COMMAND LIST COMMANDS)

Bits 0-5 comprise the command operation code.
  Bits 0-4 define the tope of operation, as described below.
  Bit 5 selects the method of addressing the data to be acted upon.
    A 0 indicates direct addressing.
    A 1 indicates indirect addressing; that is, through a working register.
Bits 6 and 7 designate the microprocessor accumulator, if any, on which the operation is to be performed.
Bits 8-15 comprise an immediate data field, containing:
  immediate data to be used by the instruction,
  an address of data to be used by the instruction, or
  an address of a working register that, in turn, contains an address of data to be used by the instruction.

Some command list instructions operate on a single bit, while others operate on a whole byte. The discussion for each individual command defines whether that command operates on a single bit or an entire byte.

10.2 COMMAND DESCRIPTIONS

This section contains the full set of command descriptions grouped functionally into the following five categories:
  External-internal data movement
  Internal data movement
  Accumulator operatives
  Conditional jumps
  Attachment hardware control

10.2.1 EXTERNAL-INTERNAL DATA MOVEMENT

The external-internal data movement commands transfer data to and from the attachment card. These commands do not access the working registers. They do, however, return status to the accumulators. The commands in this category are:
DIDO
DIDOI
XFER
XFERI

DIDO (111000 AC Immediate data)

This command moves data. There are four types of data move operations:
Type A Move data from the device input bus, port 1, to the device input register. (Bits 8 and 9=00)
Type B Move data from host storage to microprocessor host input registers. (Bits 8 and 9=01)
Type C Move data from device output registers to the device output bus, (port 0). (Bits 8 and 9=10)
Type D Move data from microprocessor output registers to host storage. (Bits 8 and 9=11)

Up to eight words of data can be moved per instruction. Data transfers to the device interface are multiplexed/demultiplexed by the attachment hardware. The device interface provides an associated subaddress (S0,S1,S2) for each transfer, as follows:

| Transfer | Device I/O register | S0 | S1 | S2 |
|---|---|---|---|---|
| Word 0 | Bits 0-15 (bytes 0-1) | 0 | 0 | 0 |
| Word 1 | Bits 16-31 (bytes 2-3) | 0 | 0 | 1 |
| Word 2 | Bits 32-47 (bytes 4-5) | 0 | 1 | 0 |
| Word 3 | Bits 48-63 (bytes 6-7) | 0 | 1 | 1 |
| Word 4 | Bits 64-79 (bytes 8-9) | 1 | 0 | 0 |
| Word 5 | Bits 80-95 (bytes 10-11) | 1 | 0 | 1 |
| Word 6 | Bits 96-111 (bytes 12-13) | 1 | 1 | 0 |
| Word 7 | Bits 112-127 (bytes 14-15) | 1 | 1 | 1 |

This sub-addressing scheme works for both input and output transfers on the device interface (operation types A and C, previously defined).

Input or output transfers with the host (operation types B and D) are multiplexed/demultiplexed from input and output registers as follows:

| Transfer | Input/Output register |
|---|---|
| Word 0 | Bits 128-143 (bytes 0-1) |
| Word 1 | Bits 144-159 (bytes 2-3) |
| Word 2 | Bits 160-175 (bytes 4-5) |
| Word 3 | Bits 176-191 (bytes 6-7) |
| Word 4 | Bits 192-207 (bytes 8-9) |
| Word 5 | Bits 208-223 (bytes 10-11) |
| Word 6 | Bits 224-239 (bytes 12-13) |
| Word 7 | Bits 240-255 (bytes 14-15) |

Data transfers with host storage are addressed in ascending order. Each DIDO instruction begins at the next ascending address from the last DIDO instruction. That is, a block of data is moved by this instruction, and each block of one to eight words is addressed in successive order in host storage. Data is transferred with the area defined by the start programmable offline mode DCB.

Parity for DIDO data is generated by the attachment. The immediate data field is coded as follows:
Bit 8—Read/Write (Data direction is with reference to the attachment).
  This bit is a 0 when:
    Data is transferred to the attachment from the device (operation type A)
    Data is transferred to the attachment from host storage (operation type D).
Bit 9—Device/host
  This bit is a 0 when data is transferred with the device.
  This bit is a 1 when data is transferred with the host.
Bits 10-12—These bits determine the initial word to be transferred. They contain a value (0-7) defining word 0 through word 7. On device transfers, bits 10, 11, 12 are the initial subaddress S0, S1, and S2, respectively.

Bits 13-15—These bits contain a value that is one less than the number of words to be transferred. For example:

Bits 13, 14, 15 = 0,0,0 indicates only one word transfer.

Bits 13, 14, 15 = 0,1,0 indicates three word transfers.

Bits 13, 14, 15 = 1,1,1 indicates eight word transfers.

If the DIDO instruction does not complete the transfer within 21 seconds when DCB word 0 bit 14 is a one, or if the byte count for either DCB word 2 or 6 is exhausted by the transfer, an incomplete transfer results. Incomplete transfers return to the designated accumulator the number of words not transferred by the instruction. Incomplete transfers also set the carry/borrow/error flag, which can be tested by the JFLG command. Otherwise, the flag is reset.

If the device interface requests transfers in excess of the word count specified by bits 13-15, the device interface does not acknowledge the request. However, the request remains pending. The carry/borrow/error flag is also set in this situation.

DIDOI 111001AC Working register address

This is the indirect form of DIDO.

XFER 100110AC Immediate data

This command causes one of the following types of operation:

Type A   Copy data from the device input register to the microprocessor's host register.

Type B   Copy data from the microprocessor's host input register to the device output register.

Type C   Cause a block of data to transfer at high speed from the host interface to the device interface.

Type D   Cause a block of data to transfer at high speed from the device interface to the host interface.

The device interface subaddress bits (S0,S1,S2) and the accumulators are unused and unaltered by this command.

Note: XFER is intended for host device data transfer situations where inline (HS mode) processing is unsuitable only). XFER is not recommended for replacement of high-speed operations due to the limitation of the word count and the delay in setting up the instruction in the attachment.

In spite of such limitations, however, the XFER function does offer a subtle advantage over HS. During XFER operation, data is stepped through the high-speed I/O path to or from the host by microprocessor commands. This interface is provided with a continuous path for byte parity and parity check circuits. Thus, higher data integrity is achieved.

The immediate data field is coded as follows:

| Operation type | Data movement |
|---|---|
| A or B | Copy an input register to an output register: Bit 8 is a 0 to copy a register. Bit 9 is a 0 for host-to-device; it is a 1 for device-to-host. Bits 10-12 are the initial word address in the input register. Bits 13-15 are a binary value that is one less than the number of words to be transferred. |
| C or D | Transfer a block of data from the host to the device or from the device to the host: |

| Operation type | Data movement |
|---|---|
| | Bit 8 is a 1 to transfer data. Bit 9 is a 0 for host-to-device; it is a 1 for device-to-host. Bits 10-15 are a binary value that is one less than the number of words to be transferred. |

If the XFER instruction does not complete the transfer within 21 seconds when DCB Word 0 bit 14 is a one, or if the byte count from DCB word 2 or 6 is exhausted by the transfer, an incomplete transfer results. Incomplete transfers return to the designated accumulator the number of words not transferred by the instruction. Incomplete transfers also set the carry/borrow/error flag, which can be tested by a JFLG command.

If the device requests transfers in excess of the byte count specified in bits 10-15 of the XFER command, the device interface does not acknowledge. However, the request remains pending. The carry/borrow/error flag is also set in this situation. Otherwise, the flag is reset.

Data transfers with host memory are addressed in ascending order. Each XFER instruction begins at the next ascending address from the last XFER instruction. That is, a block of data is moved by this instruction, and each block of 1 to 64 words is addressed in successive order in host storage. Data is transferred to or from the area in shared storage defined by the start programmable offline mode DCB.

XFERI 100111XX Working register address

This is the indirect addressing form of XFER.

FIG. 7 illustrates the handling of the foregoing external-internal secondary commands (DIDO, XFER) by the attachment microprocessor. The microprocessor allocates 32 word spaces 101 in microprocessor storage as registers for storage of data words transferred by these commands. Of these register spaces, 16 are dedicated as "input registers" 102 for receiving externally originated data and 16 are dedicated as output registers 103 for use as sources of output data. The input registers 102 are further grouped into 8 "host" input registers 104 for receiving external data originating from host storage, and 8 "device" input registers 105 for receiving data originated by the device. The output registers 103 are similarly grouped into 8 "host" output registers 106 for supplying data to be transferred to the host system and 8 "device" output registers 107 for supplying data for transfers to the device.

The actions (data movements) evoked by specific types of DIDO and XFER secondary commands are indicated in broken outline boxes containing indications of these commands. Thus, DIDO type A shown at 108 transfers data from the device to a selected device input register 105, DIDO type B shown at 109 transfers data from the host to a selected host input register 104, DIDO type C shown at 110 transfers data from a selected device output register 107 to the device, DIDO type D shown at 111 transfers data from a selected output register 106 to the host system, XFER type C shown at 112 transfers data directly from the host interface to the device interface via path "u" shown in part at 113 and in part at 114, and XFER type D shown at 118 transfers data directly from the device interface to the host interface via path "v" shown partly at 119 and partly at 120. In addition, XFER type A shown at 121 permits transfer of data from device input registers 105 to host output registers 106, and XFER type B shown at 122 directs transfers of data from host input registers 104 to device output registers 107.

Other registers in microprocessor storage (or discrete microprocessor hardware) are reserved as accumulators 112, working or "scratchpad" registers 123 and operation status registers 124. There are 4 accumulators, up to 64 working registers, and at least 8 operation status registers. Status information associated with each execution of DIDO or XFER is stored in an accumulator register as suggested at 125, and moved from that register to an operation status register by one of the internal data movement commands described next.

10.2.2 INTERNAL DATA MOVEMENT

Internal data movement commands tranfer data within the attachment registers. These commands access the working registers, and they transfer data to or from the accumulators.

The commands in this category are:
DECR
DECRI
GABB
GABBI
GABL
GABLI
GARB
GARBI
GARL
GARLI
GOBB
GOBBI
GOBL
GOBLI
GORB
GORBI
GORL
GORLI
INCR
INCRI
LDIA
LDIAI
PABB
PABBI
PABL
PABLI
PARB
PARBI
PARL
PARLI DECR 011100XX Working register address This command subtracts 1 from the working register indicated in the immediate data field. If an underflow occurs, hex FF results, and the carry/borrow/error flag is set. Otherwise, the flat is reset. The result appears in the indicated working register. The accumulators are unaffected by this command.

DECRI 011101XX Working register address

This is the indirect address form of DECR.

GABB 000110AC Input register address

This command ANDs a byte from the input register (indicated by bits 11-15 of the immediate data field) into the eight-bit contents of the accumulator designated by bits 6 and 7.

GABBI 000111AC Working register address

This is the indirect address form of GABB. Bits 3-7 of the indicated working register's contents are decoded to select the byte from the input register.

GABL 000100AC Input register address

This command ANDs a bit (indicated by the immediate data field) of the input register with the most-significant bit of the accumulator designated by bits 6 and 7. The result remains in the most-significant bit of the accumulator. The remainder of the accumulator is unaltered.

GABLI 000101AC Working register address

This is the indirect address form of GABL.

GARB 001110AC Working register address

This command ANDs the eight-bit contents of the register indicated by the immediate data field into the accumulator designated by bits 6 and 7.

GARBI 000111AC Working register address

This is the indirect addressing form of GARB.

GARL 001100AC Working register address

This command ANDs the most-significant bit of a working register (indicated by the immediate data field) with the most-significant bit of the accumulator designated by bits 6 and 7. The result remains in the most-significant bit of the accumulator. The remainder of the accumulator is unaltered.

GARLI 001101AC Working register address

This is the indirect address form of GARL.

GOBB 000010AC Immediate data

This command ORs a byte from the input register (indicated by bits 11-15 of the immediate data field) into the eight-bit contents of the accumulator designated by bits 6 and 7.

GOBBI 000011AC Working register address

This is the indirect address form of GOBB. Bits 3-7 of the indicated working register's contents are decoded to select the byte from the input register.

GOBL 000000AC Input register address

This command ORs a bit (indicated by the immediate data field) of the input register with the most-significant bit of the accumulator designated by bits 6 and 7. The result remains in the most-significant bit of the accumulator. The remainder of the accumulator is unaltered.

GOBLI 000001AC Working register address

This is the indirect address form of GOBL.

GORB 001010AC Working register address

This command ORs the eight-bit contents of the working register indicated by the immediate data field into the accumulator designated by bits 6 and 7.

GORBI 001011AC Working register address

This is the indirect address form of GORB.

GORL 001000AC Working register address

This command ORs the most-significant bit of a working register (indicated by the immediate data field) with the most-significant bit of the accumulator designated by bits 6 and 7. The result remains in the most-significant bit of the accumulator. The remainder of the accumulator is unaltered.

GORLI 001001AC Working register address

This is the indirect address form of GORL.

INCR 011000XX Working register address

This command adds 1 to the working register indicated in the immediate data field. If an overflow occurs, hex 00 results, and the carry/borrow/error flag is set. Otherwise, the flag is reset. The result appears in the indicated working register. The accumulators are unaffected by this command.

INCRI 011001XX Working register address

This is the indirect address form of INCR.

LDIA 011010AC Immediate data

This command loads the immediate data field into the accumulator designated by bits 6 and 7. A LDIA instruction with an immediate field of hex 00 clears the designated accumulator.

LDIAI 011011AC Working register address

This is the indirect address form of LDIA. This command loads the eight-bit contents of the working register indicated by the immediate data field into the accumulator designated by bits 6 and 7.

PABB 010010AC Output register address

This command places a byte of data from the accumulator designated by bits 6 and 7 into the output register at the byte position indicated by bits 11-15 of the immediate data field.

PABBI 010011AC Working register address

This is the indirect address form of PABB. Bits 3-7 of the indicated working register's contents are decoded to select the byte on the output register.

PABL 010000AC Output register address

This command places the most-significant bit of the accumulator designated by bits 6 and 7 into a bit position (indicated by the immediate data field) in the output register. The remainder of the output register is unaltered.

PABLI 010001AC Output register address

This is the indirect address form of PABL.

PARB 010110AC Working register address

This command places a byte of data from the accumulator designated by bits 6 and 7 into the working register indicated by bits 8-15 of the immediate data field.

PARBI 010111AC Working register address

This is the indirect address form of PARB.

PARL 010100AC Working register address

This command places the most-significant bit of the accumulator designated by bits 6 and 7 into the most-significant bit position of a working register indicated by the immediate data field. The remainder of the working register is unaltered.

PARLI 010101AC Working register address

This is the indirect address form of PARL.

10.2.3 ACCUMULATOR OPERATIVES

The accumulator operatives cause operations to be performed on data in the accumulators. The following table summarizes the accumulator operative commands.

| Command | Operation |
|---------|-----------|
| ADD | Adds the contents of the accumulator 0 to the contents of the designated accumulator (Acc n). |
| CLR | Resets the most-significant bit in the designated accumulator (ACC n) to 0. |
| INV | Inverts the most-significant bit in the designated accumulator (ACC n). |
| SROT(1) | Shifts or rotates the contents of the designated accumulator (Acc n). (Refer to the full description of this command for coding details). |
| XOR | Exclusive ORs the contents of the accumulator 0 with the contents of the designated accumulator (Acc n). |

Full descriptions of these commands follow:

| ADD | 110010AC | XXXXXXXX |
|-----|----------|----------|
|     | or       |          |
|     | 110111AC | XXXXXXXX |

This command adds the eight-bit contents of accumulator 0 to the eight-bit contents of the designated accumulator. The result remains in the designated accumulator. A carry sets the carry/borrow/error flag. Otherwise, the flag is reset.

The immediate data field is unused, and the indirect form of the command (bit 5=1) operates identically to the direct form.

| CLR | 110100AC | XXXXXXXX |
|-----|----------|----------|
|     | or       |          |
|     | 110101AC | XXXXXXXX |

This command sets to 0 the most-significant bit in the accumulator designated by bits 6 and 7. The immediate data field is unused, and the indirect form of the command (bit 5=1) operates identically to the direct form.

| INV | 110000AC | XXXXXXXX |
|-----|----------|----------|
|     | or       |          |
|     | 110001AC | XXXXXXXX |

This command inverts the most-significant bit in the accumulator designated by bits 6 and 7. The immediate data field is unused, and the indirect form of the command (bit 5=1) operates identically to the direct form.

| SROT | 111010AC | Immediate Data |
|------|----------|----------------|

This command causes the designated accumulator to rotate or shift data to either the left or right, according to the following decode of the immediate field:

| Bits 8 9 | Shift/rotate type operation |
|---|---|
| 0 0 | Shift left. Set the carry/borrow/error flag if a 1 is shifted out at any time during the instruction. The flag is reset, otherwise. |
| 0 1 | Shift right. Set the carry/borrow/error flag if a 1 is shifted out at any time during the instruction. The flag is reset, otherwise. |
| 1 0 | Rotate left. |
| 1 1 | Rotate Right. |

Bits 10–15 designate the number of shifts or rotates to be performed. (Each rotate or shift consumes 100 microseconds.)

| SROTI | 111011AC | Working register address. |
|---|---|---|
| | This is the indirect form of SROT. | |
| XOR | 110110AC | XXXXXXXX |
| | or | |
| | 110111AC | XXXXXXXX |

This command Exclusive ORs the eight-bit contents of accumulator (0) with the eight-bit contents of the designated accumulator. The result remains in the designated accumulator.

The immediate data field is unused, and the indirect form of the command (bit 5=1) operates identically to the direct form.

NOTE: Byte values may be inverted by XORing all 1's with the designated accumulator.

10.2.4 CONDITIONAL JUMPS

Conditional jumps cause the instruction line address register to be reset when the specified condition is met. The new setting is the two-byte address formed as follows:

The most-significant byte of the new instruction line address is taken from the immediate data field of the last BASE instruction.

The least-significant byte of the new instruction line address is taken from the immediate data field of the current conditional jump instruction.

Note: For indirect BASE and jump command forms, the byte for the new instruction line address is taken from the working register whose address is pointed to by the immediate data field.

Notes:
1. BASE and BASEI set the most-significant byte of the jump line address.
2. RTN returns the instruction line address register to the address of the instruction immediately following the last jump instruction that was executed.

BASE 111100XX Immediate data

This command sets the most-significant byte in the base line address equal to the value in the immediate data field. The base line address is the sixteen-bit absolute line address used in all jump instructions. If the base exceeds ½ of the byte count in the load programmable offline mode DCB, an exception interrupt is reported, with cycle-steal status word 3 bit 4 set to 1. The accumulators are unaltered by this command.

BASEI 111101XX Working register address

This is the indirect form of BASE.

JAEZ 101010AC Immediate data

This command causes the instruction line address register to reset to the two-byte jump line address formed by the BASE line address (most-significant byte) accumulator and the immediate data field (least-significant byte) when the accumulator designated by bits 6 and 7 is equal to 0. The base line address is set by the BASE instruction.

JAEZI 101011AC Working register address

This is the indirect form of JAEZ.

JFLG 101110XX Immediate data

This command causes the instruction line address register to reset to the two-byte jump line address formed by the base line address (most-significant byte) and the immediate data field (least-significant byte) when the carry/borrow/error flag is set. The flag is set when:

A carry or a borrow occurs during an INCR, DECR, or ADD instruction.

A 1 is shifted out of the accumulator during a SROT instruction.

An error occurs during a DIDO or XFER instruction.

The flag is reset by this instruction. The base line address is set by the BASE instruction.

JFLGI 101111XX Working register address

This is the indirect address form of JFLG.

JPIE 101000AC Immediate data

This command causes the instruction line address register to reset to the two-byte jump line address formed by the base line address (most-significant byte) and the immediate data field (least-significant byte) when the designated accumulator is equal to accumulator 0. The base line address is set by the BASE instruction.

JPIEI 101001AC Working register address

This is the indirect address form of JPIE.

JPIG 100000AC Immediate data

This command causes the instruction line address register to reset to the two-byte jump line address formed by the base line address (most-significant byte) and the immediate data field (least-significant byte) when the designated accumulator is greater than accumulator 0. The base line address is set by the BASE instruction.

JPIGI 100001AC Working register address

This is the indirect address form of JPIG.

JPIL 100100AC Immediate data

This command causes the instruction line address register to reset to the two-byte jump line address formed by the base line address (most-significant byte) and the immediate data field (least-significant byte) when the designated accumulator is less than accumulator 0. The base line address is set by the BASE instruction.

JPILI 100101AC Working register address

This is the indirect address form of JPIL.

JPIN 101100AC Immediate data

This command causes the instruction line address register to reset to the two-byte jump line address formed by the base line address (most-significant byte) and the immediate field (least-significant byte) when the designated accumulator is not equal to accumulator 0. The base line address is set by the BASE instruction.

JPINI 101101AC Working register address

This is the indirect address form of JPIN.

| RTN | 111110XX | XXXXXXXX |
|---|---|---|
| | or | |
| | 111111XX | XXXXXXXX |

This command allows the program counter to return to the instruction immediately following the last executed jump instruction. In this way a single level of subroutine may be constructed with any jump instruction.

10.2.5 ATTACHMENT HARDWARE CONTROL

The commands in this category are used to control attachment hardware. These commands are:
STIT
STITI
TIME
TIMEI The command descriptions follow:

STIT 011110AC Immediate data

This command can be used to:
Set the hardware timer value.
Cause the attachment to interrupt the host.
Set, pulse, or clear certain lines on the device interface control bus.

For immediate data field decodes of hex X0, X1, X3 and X7 through XF, the accumulators are not used or altered.

The immediate data field is coded as follows:

Bits 8-11 correspond to bits 4-7 of DCB word 1. With one exception, identical hardware timer operation is achieved. The hardware timer may be reinitialized to 15 of the 16 selectable timings described for DCB word 1 under HS Mode above. The 0 decode function operates differently; a 0 decode does not change a previously set timer value. The timer function changes less than one but more than one-half of a timer period after the STIT command is completed.

Bits 12-15 are coded as follows:

| Hex Value | Meaning |
|---|---|
| 0 | No operation. |
| 1 | Issue 'reset' pulse on the device interface. |
| 2 | Move the state of the 'device status bit' line on the device interface to the most-significant bit position of the designated accumulator. |
| 3 | Increment the special interface counter. |
| 4 | Set the most-significant byte of the special interface counter from the designated accumulator. |
| 5 | Read the least-significant byte of the special interface counter to the designated accumulator. |

-continued

| Hex Value | Meaning |
|---|---|
| 6 | Set the least-significant byte of the special interface counter from the designated accumulator. |
| 7 | Reserved. |
| 8 | Report an exception interrupt to the host. |
| 9 | Report a device end interrupt to the host. |
| A | Report an exception with attention interrupt to the host. |
| B | Report a device end with attention interrupt to the host. |
| C | Set the 'last transfer' line on the device interface. |
| D | Set the 'command' line on the device interface. |
| E | Set the 'status' line on the device interface. |
| F | Clear all device interface tags. |

STITI 011111AC Working register address

This is the indirect addressing form of STIT.

TIME 100010XX Immediate data

This command provides a variable time delay in the process. This command delays 0.333 millisecond if the immediate data field is 00, or 1 millisecond times the immediate data field otherwise. For example, 08 in the immediate data field causes the process to wait 8 milliseconds on this instruction, and 00 causes it to wait 0.333 millisecond. (The delay is within ±10.0% of the value indicated in the immediate data field.)

The accumulators are unused and unaltered by this command.

TIMEI 100011XX Working register address

This is the indirect addressing form of TIME.

10.4 SUMMARY OF COMMAND SEQUENCES

Figure 8:
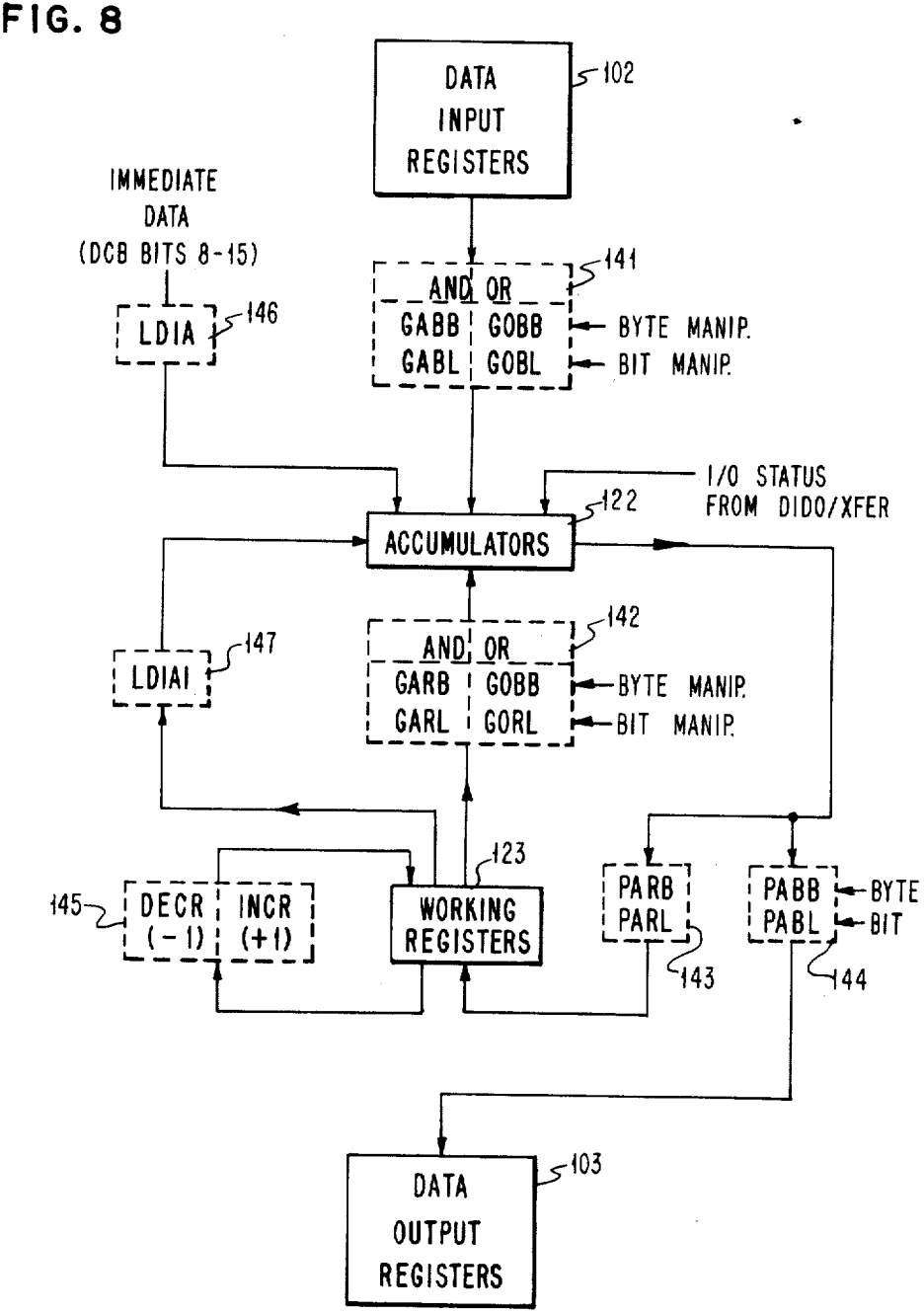
FIG. 8 illustrates the logical organization of a secondary subsystem for moving data internally in response to indicated secondary commmands.

FIG. 8 illustrates the actions in the subject microprocessor organization evoked by the foregoing commands. Commands GABB, GABL, GOBB and GOBL, shown at 141, direct the microprocessor to logically combine information in data input registers 102 with data in accumulators 122. Commands GABB and GOBB respectively designate byte-ANDing and byte-ORing functions relative to specified single bytes in specified input and accumulator registers. Commands GABL and GOBL respectively direct bit-ANDing and OR-ing operations relative to designated single bits in designated input and accumulator registers.

Commands GARB, GARL, GORB and GORL, shown at 142, direct logical operations relative to data in working registers 123 and accumulator registers 122. GARB and GORB respectively designate byte-AND and byte-OR operations relative to designated single bytes in specified registers, and GARL and GORL respectively designate bit-AND and bit-OR operations relative to specified single bits in specified registers.

Commands PARB and PARL, shown at 143, respectively define movement of a specified byte (PARB) or bit (PARL) from a specified accumulator register to a specified working register 123. Commands PABB and PABL, shown at 144, respectively define movements of a specified single byte (PABB) or bit (PABL) from a designated accumulator to a designated output register 103.

Commands DECR and INCR, shown at 145, respectively designate unit decrementing and unit incrementing operations relative to data stored in a specified working register. The result is placed in that register.

Command LDIA shown at 146 takes data from the immediate data field of the command (see "memory map" discussion below) and loads it into a specified accumulator register. Command LDIAI shown at 147 takes data from a working register specified in the immediate data field of the command and loads it into a specified accumulator register.

11 DEVICE INTERFACE FORMATS

Figure 9:
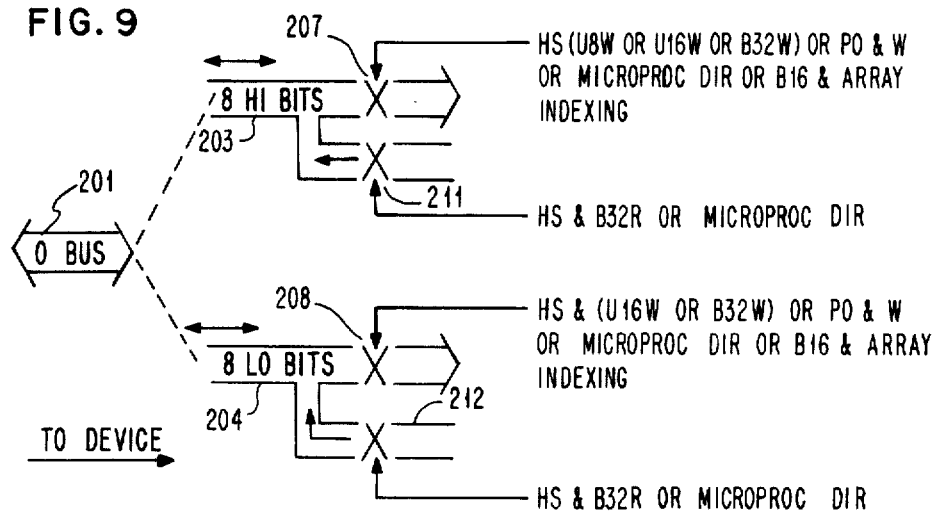
FIG. 9 illustrates a device interface for busing variable format data relative to a secondary subsystem adapter in accordance with the high speed mode of operation associated with the present invention.

FIG. 9 illustrates the data busing facilities at the device interface, and the various formats in which these buses can be used. The interface contains 32 data busing lines including 16 lines 201 termed the "0" bus group, and 16 lines termed the "1" bus group. Group 201 consists of a high order set of 8 lines 203 and a lower order set of 8 lines 204. Group 202 contains a high order set of 8 lines 205 and a low order set of 8 lines 206.

As suggested at "switching" position 207 data bytes are transferrable from the attachment to the device through set 203 during HS mode write operations in either 8-bit or 16-bit unidirectional format (U8W or U16W) or 32-bit bidirectional format (B32W), or during PO mode output operations (POXW), or during HS mode "array indexing" operations in format (B16). In the array indexing operation the data transferred at position 207 is an 8-bit portion of a 16-bit array address. At switching position 208 outgoing data is transferred byte sequentially to the device via low order set 204 during HS mode write operations in 16-bit unidirectional or 32-bit bidirectional format (U16W or B32W), or during PO mode output operations or during array indexing operations.

In the HS mode 16-bit unidirectional and 32-bit bidirectional write operations, the PO mode output operations, and the array indexing operations, paths 207 and 208 are operated in parallel. In the array indexing operation "data" sent out over these paths respresents addressing information associated with data concurrently being sent or received through switching positions associated with the 1 bus group. For additional details as to these formats and the array indexing operation refer to the cross referenced Heath application BC9-81-011.

During HS mode operations paths 207 and 208 are controlled by adapter 3b (FIG. 1) and during array indexing operations these paths are operated by the attachment microprocessor (via "MICROPROC DIRECT" control) in coordination with operations of adapter 3b relative to paths 209 and 210. These paths may also be operated individually by the microprocessor via its "MICROPROC DIRECT" access; e.g. for conducting diagnostic operations relative to these paths and the device.

Switching paths 209 and 210 for respectively steering data from "1" bus group sets 205 and 206 to the device interface are operated jointly when data is being transferred during a high speed write operation in either 16 or 32 bit bidirectional format (in the 32-bit case data is presented over these paths in parallel with data presented via paths 207 and 208, and in the 16-bit array indexing case data is presented in parallel with an array address function presented on paths 207 and 208). These paths are also subject individually to direct microprocessor control.

Switching paths 211 and 212 transfer (high and low byte portions of) data in parallel with paths 213 and 214, from the device interface to the 0 bus group, when a read operation is being conducted in HS mode with a bidirectional 32-bit format. These paths are also operable either jointly or separately under direct microprocessor control.

12 MICROPROCESSOR ORGANIZATION AND MEMORY MAP

Figure 10:
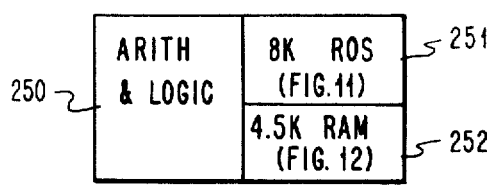
FIG. 10 illustrates a schematic block diagram of a secondary microprocessor and its ROS and RAM.
Figure 11:
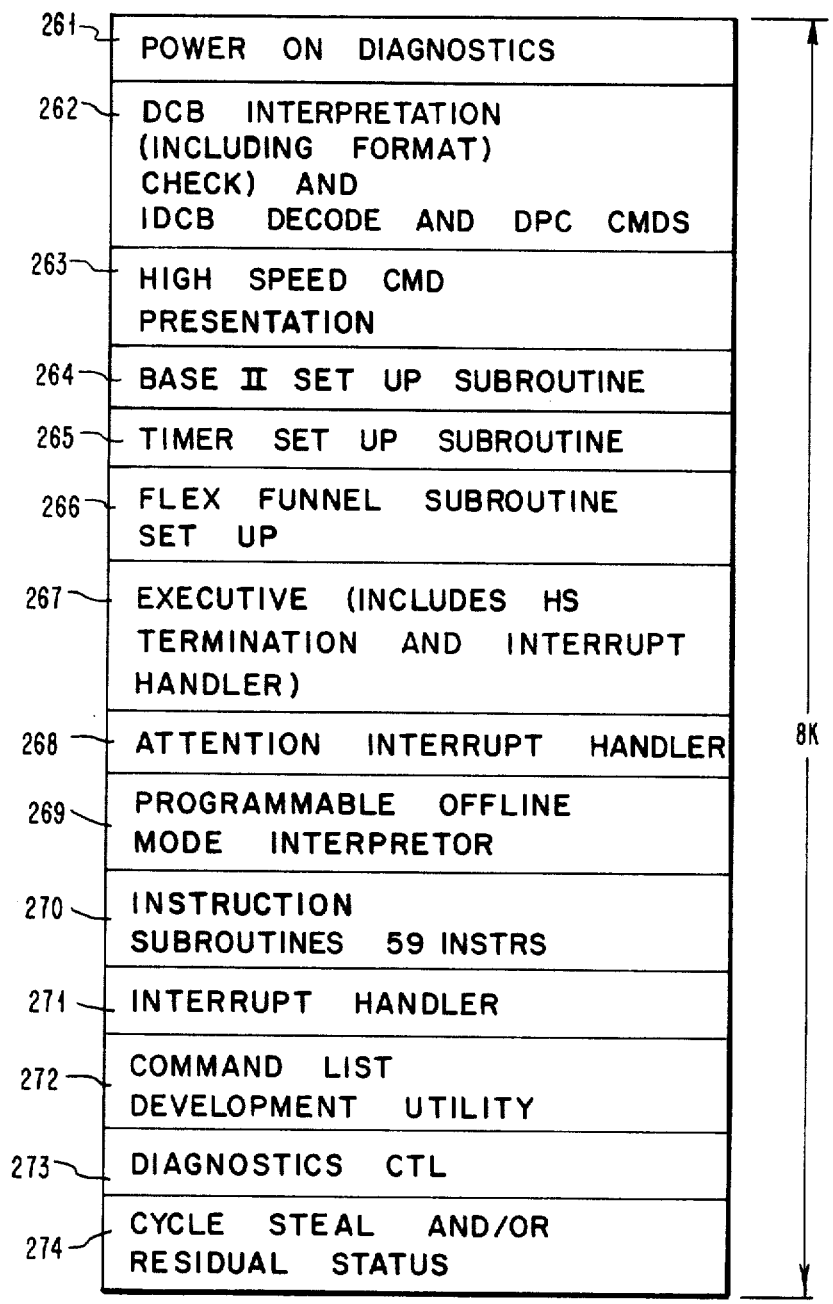
FIGS. 11 and 12 respectivelly illustrate maps of ROS and RAM allocation; ROS for subroutine storage and RAM for storage of IDCBs, DCBs, data, command list parameters, etc.
Figure 12:
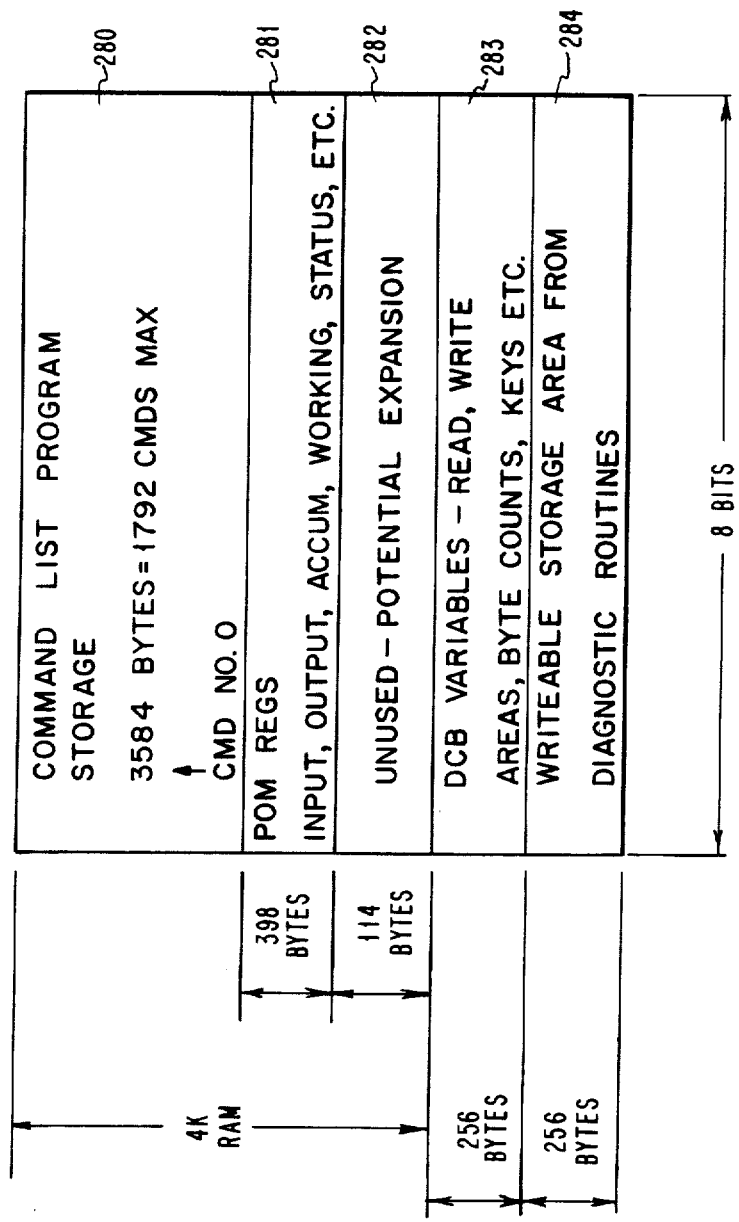

FIGS. 10-12 show the organization of the microprocessor with particular emphasis on the allocation of its storage resources (memory map) required for implementing the subject attachment subsystem. The microprocessor 250 (FIG. 10) communicates with the microprocessor storage facilities including an 8K (8,000 byte) ROS (Read Only Store) 251 and a 4.5K RAM (Random Access Memory) 252. The microprogram control functions mapped into ROS 251 on a fixed (non-volatile) basis are shown in FIG. 11. The mapping of other (volatile) information parameters into RAM 252 is shown in FIG. 12. Memories 251 and 252 are 8-bit wide facilities accessed by the microprocessor 250 through an 8-bit parallel bus (3i, FIG. 1).

As previously noted the microprocessor may be physically embodied using an INTEL ®8085A microprocessor. ROS 251 may be implemented using MOS-TEK ®MK 36000 ROM chips (each 4K by 8). RAM 252 may be implemented with four INTEL 8185 static RAM modules. Power for all of the attachment elements may be derived from the main power supply source of the host subsystem.

Microprocessor 250 contains an arithmetic logic unit, an 8-bit wide internal bus and internal registers for performing arithmetic and logical translation operations on byte units of information (refer to Chapter 6 in "MSC-80/85 TM Family User's Manual published October 1979 by INTEL Corporation). The basic instruction architecture permits this microprocessor (refer to pages 6-15 and 6-16 in chapter 6 of the foregoing User Manual) to perform many of the byte handling functions presently specified for PO mode operation. With presently described programming such machine language instructions are coded into assembly language programs for interpreting presently defined secondary (command list) commands.

As shown in FIG. 11, ROS memory 251 is partitioned into sections 261-274 dedicated for storage of indicated microprogram functions. Section 261 is reserved for power-on sequencing control and diagnostic functions not directly relevant to the present invention. Section 262 is reserved for microprogram sequences for handling DPC data transfer operations associated with IDCBs and other IDCB-related operations for retrieving, checking and interpreting DCBs. Section 263 is used for staging command portions of HS mode DCBs for external presentation (e.g. DCB words 2 and 3 FIG. 5). Section 264 is reserved for preparing self-sequencing adapter 3a (sometimes termed "BASE II Adapter") for its various data transfer operations relative to the host interface, the attachment microprocessor and device interface adapter 3b. Section 265 is reserved for preparing a not-shown timer circuit (which may be contained in the control port adapter block 3d of FIG. 1). Section 266 is reserved for preparing self-sequencing adapter 3b (sometimes referred to as "the flexible funnel", see application Ser. No. 345,177 referenced previously). Section 267 is reserved for subroutines for terminating HS mode operations and presenting status to the host subsystem. Section 268 is reserved for controlling presentation of attention interruptions and associated status information to the host subsystem. Section 269 is dedicated for interpreting PO mode commands (instructions). Section 270 contains "instruction" subroutines for performing command list programs. Section 271 is reserved for interruption handler subroutines for attending to interruption requests presented at the device interface. Section 272 is reserved for "command list development utility" subroutines associated with a not-shown utility keyboard/display terminal for permitting a command list programmer to directly key in command list functions for in situ development of command list command operators. Section 273 is reserved for various diagnostic subroutines. Section 274 is reserved for handling cycle steal status and residual status functions previously defined.

The approximate sizes of areas 261-274 (in bytes) are respectively: 250 (area 261), 1000 (area 262), 150 (area 263), 500 (area 264), 100 (area 265), 1000 (area 266), 700 (area 267), 200 (area 268), 1000 (area 269), 1500 (area 270), 250 (area 271), 500 (area 272), 250 (area 273), and 500 (area 274).

FIG. 12 indicates partitioning of RAM memory 252 into five sections 280-284 individually reserved for specialized usage. Section 280 is reserved for storage of command list programs. As previously noted such programs are loaded during interpretation of LPO type DCBs (by microprogram subroutines contained in section 269 of memory 251). Such programs are performed in association with interpretation of SPO type DCBs (by subroutines in section 269 of memory 251), and the individual command list commands/instructions are interpreted by microprograms contained in section 270 of memory 251. Section 280 has a capacity for storage of up to 1,792 secondary commands (up to 3,584 bytes). It should be understood that if storage of longer command lists is required (by a particular user) memory 252 could easily be expanded without requiring any additional invention.

Section 281 is reserved for input and output registers, accumulator registers, working registers, status storage registers, etc. (see FIGS. 7 and 8). Unused section 282 is available for supporting the optional command list development terminal mentioned previously. Section 283 is reserved for storage of DCB variables (addresses for accessing host storage, current byte count factors, etc.). Section 284 is reserved for storage data collected by diagnostic routines (see section 273 FIG. 11).

13 EXAMPLES OF PO MODE APPLICATIONS

The following examples of PO mode applications and associated command list programs indicate the versatility of the subject attachment subsystem. Several particularly interesting applications, discussed below under "dual mode operations", are claimed specifically, herein.

13.1 HEX TO DECIMAL CONVERSION

In this example the program reads a hexadecimal number from host storage, converts its least significant byte to a decimal equivalent and presents the converted number to a device via the device interface's most significant bus set (0 bus group high order set, see FIG. 9). Indirect addressing of registers allows the conversion to be conducted by a table lookup. The command list program described below is assumed to have been loaded into microprocessor RAM storage 252 by operation of an LPO type DCB containing a starting line parameter pointing to command line number 00 below, and that an SPO type DCB has integrated access to this list beginning at that line number.

| | | CONVERSION PROGRAM | | |
|---|---|---|---|---|
| Line Number | Command list code (hex) | | Instruction | Purpose |
| 00 | 6900 | LDIA | A1 = 0 | Set-up table |
| 01 | 5900 | PARB | A1 · R0 | table |
| 02 | 6901 | LDIA | A1 = 1 | |
| 03 | 5901 | PARB | A1 · R1 | |
| 04 | 6902 | LDIA | A1 = 2 | |
| 05 | 5902 | PARB | A1 · R2 | |
| 06 | 6903 | LDIA | A1 = 3 | |
| 07 | 5903 | PARB | A1 · R3 | |
| 08 | 6904 | LDIA | A1 = 4 | |
| 09 | 5904 | PARB | A1 · R4 | |
| 0A | 6905 | LDIA | A1 = 5 | |
| 0B | 5905 | PARB | A1 · R5 | |
| 0C | 6906 | LDIA | A1 = 6 | |
| 0D | 5906 | PARB | A1 · R6 | |
| 0E | 6907 | LDIA | A1 = 7 | |
| 0F | 5907 | PARB | A1 · R7 | |
| 10 | 6908 | LDIA | A1 = 8 | |
| 11 | 5908 | PARB | A1 · R8 | |
| 12 | 6909 | LDIA | A1 = 9 | |
| 13 | 5909 | PARB | A1 · R9 | |
| 14 | 6910 | LDIA | A1 = 10 | |
| 15 | 590A | PARB | A1 · RA | |
| 16 | 6911 | LDIA | A1 = 11 | |
| 17 | 590B | PARB | A1 · RB | |
| 18 | 6912 | LDIA | A1 = 12 | |
| 19 | 590C | PARB | A1 · RC | |
| 1A | 6913 | LDIA | A1 = 13 | |
| 1B | 590D | PARB | A1 · RD | |
| 1C | 6914 | LDIA | A1 = 14 | |
| 1D | 590E | PARB | A1 · RE | |
| 1E | 6915 | LDIA | A1 = 15 | set-up |
| 1F | 590F | PARB | A1 · RF | table |
| 20 | E040 | DIDO | From host, first word, first position | Input from host |
| 21 | 6900 | LDIA | A1 = 0 | |
| 22 | 0911 | GOBB | A1 ⊕ 11 (host input register, least-significant byte) → A | |
| 23 | 5920 | PARB | A1 · R20 | Convert |
| 24 | 6900 | LDIA | A1 = 0 | |
| 25 | 2D20 | GORBI | A1 ⊕ with register pointed to by R20  A1 | |
| 26 | 4900 | PABB | A1 · 00 (device output register) | Output to device |
| 27 | E080 | DIDO | To device, first word, first position | |
| 28 | 7809 | STIT | Device end interrupt | |

The Load Intermediate instructions LDIA at successive even line numbers from 00 to 1E (specified in hex form) contain decimal values 0 to 15 in their immediate data fields, and specify transfers of said values to a specific accumulator register "A1". The "Put Accumulator to Working Register" instructions PARB at odd positions from 01 to 1F transfer contents of A1 to successive working registers R0 through RF, thereby loading the "conversion table". The DIDO instruction at line 20 transfers a hexadecimal "argument" value to be converted from the interface into a host input register in microprocessor storage (section 281 of RAM 252, FIG. 12), and the next LDIA instruction sets 0's into register A1. The following GOBB instruction OR's the argument value in the input register with the 0's in A1 and stores the result (argument value) in A1. The following PARB transfers the argument value from A1 to working register R20, and A1 is again set to 0's by the next LDIA. The following GORBI instruction OR's the contents of A1 with those of the working register pointed to by the (argument) value in R20, thereby "looking up" the decimal equivalent of the argument number, and stores the result in A1. The content of A1 is then moved to device output register "00" by the following PABB instruction, and then to the device interface by the next DIDO instruction. The next STIT instruction causes a device end interrupt to be posted, terminating the operation.

As an example of the "assembly language" microprogramming needed to interpret a subject secondary instruction consider the following routine for fetching and executing the above mentioned LDIA instruction using the routine language microinstructions of the 8085A as described in the above-referenced family user's manual.

First, the address of the next command list command must be located in an "address" work space (if this is the first access to the list the number in this address space must be initialized to the value pointed to by the start line value contained in the last-interpreted LPO type DCB), and its contents transferred to the address register used for accessing RAM 252 (this requires one or more native Move instructions). Then RAM 252 is accessed at the designated command list line number position and its contents (i.e. an LDIA instruction) are moved to a working register (e.g. by a native Move instruction). Then using a number of native Compare instructions, the "Op Code" of the fetched command list instruction (in this case 69XX) is compared to a series of successive values until a match is found. After each comparison the microprocessor executes a native conditional jump instruction for branching conditionally to a subroutine associated with the interpretation of a corresponding secondary command op code. Accordingly, when the match occurs the microprocessor jumps to the sequence for interpreting the fetched command, in this case LDIA. Performing next a series of comparison and conditional jump operations relative to bits 6 and 7 of the instruction (LDIA) the microprocessor searches for a match to the accumulator number designated by these bits. When a match is found the microprocessor jumps to a native instruction for moving the immediate data field of the subject LDIA instruction from the working register it now occupies to the designated accumulator.

13.1 CHECKSUM CALCULATION PROGRAM

This example of a progrogrammable host offline mode application calculates a checksum for a command list in host storage. The attachment calculates the command list checksum and stores it at the end of the command list. In this ecample, the command list program calculates the checksum for its own command list.

The LPO type DCB is coded as follows:
Chaining on
Suppress exception on
21-second time-out on
DCB work 3 = 0000 (hex)
DCB work 5 = address of start programmable offline mode DCB
DCB word 6 = byte count of command list X + 2
DCB word 7 = starting address of command list X.

This information is stored by the microprocessor and the list is also loaded (into RAM 252).

The SPO type DCB for the checksum calculator sets the following:
Suppress exception off
Chaining off
Write address = starting address of command list X
Write byte count = byte count of command list X
Read address = write address + write byte count
Read byte count = 0002 bytes After storing this information the microprocessor enters the locally stored command list at line number 0000 (specified by word 3 in the LPO type DCB) and begins this sequence.

CHECKSUM PROGRAM

| Line number | Command List Code (hex) | Instruction | | Purpose |
|---|---|---|---|---|
| 00 | 6B44 | LDIA | A3 with most-significant byte of command list byte count* | |
| 01 | 5B03 | PARB | A3 · R3 | |
| 02 | 6A00 | LDIA | A2  0 with least-significant byte of command list byte count** | Set-up |
| 03 | 5A02 | PARB | A2 · R2 | |
| 04 | 6800 | LDIA | A0 = 0 | |
| 05 | 6900 | LDIA | A1 = 0 | |
| 06 | 5800 | PARB | A0 · R0 | |
| 07 | 6B00 | LDIA | A3 = 0 | |
| 08 | 2B03 | GORB | A3 ⊕ R3   A3 | Check for |
| 09 | 2B02 | GORB | A3 ⊕ R2   A3 | terminating |
| 0A | ABID | JAEZ | Jump if A3  0: to 1D | condition |
| 0B | 6B00 | LDIA | A0 = 0 | Fetch next |
| 0C | E040 | DIDO | From host: first word, first position | command list word |
| 0D | 0810 | GOBB | A0 ⊕ 10 (host input register) = A0 | |
| 0E | C900 | ADD | A0 + A1 = A1 | |
| 0F | B819 | JFLG | Jump if flag is set: to 19 | |
| 10 | 6B00 | LDIA | A0 = 0 | |
| 11 | 0811 | GOBB | A0 ⊕ 11 (host input register)  A0 | |
| 12 | C900 | ADD | A0 · A1 = A1 | Calculation |
| 13 | B819 | JFLG | Jump if flag is set: to 19 | |
| 14 | 7003 | DECR | R3 = R3 - 1 | |
| 15 | B81B | JFLG | Jump if flag is set: to 1B | |
| 16 | 7003 | DECR | Re   Re  1 | |

CHECKSUM PROGRAM -continued

| Line number | Command List Code (hex) | | Instruction | Purpose |
|---|---|---|---|---|
| 17 | B81B | JFLG | Jump if flag is set: to 1B | |
| 18 | A007 | JPIE | Jump if A0 = A0: to 07 (unconditional) | |
| 19 | 6000 | INCR | R0 = R0 + 1 | Subroutine |
| 1A | F800 | RTN | | |
| 1B | 7002 | DECR | R2 = R2 − 1 | Subroutine |
| 1C | F800 | RTN | | |
| 1D | 4911 | PABB | A1 → 11 (host output register) | |
| 1E | 6D00 | LDIAI | A1 ← R0 | Store |
| 1F | 4910 | PABB | A1 → 10 (host output register) | Checksum |
| 20 | EOCO | DIDO | To host: first word, first position | |
| 21 | 7809 | STIT | Device end interrupt | End program |

*Hex 44 for this example
**Hex 00 for this example.

In order to understand how the foregoing checksum program operates it should be understood that accumulator register A1 is used in this program to accumulate the least significant byte of the checksum, working register R0 accumulates the most significant byte of the checksum, working register R2 accumulates the most significant byte of a varying byte count and working register R3 accumulates the least significant byte of the same byte count. The checksum to be formed is the sum of all of the bytes in the command list and the varying byte count corresponds inversely to the number of bytes summed (i.e. it should be zero when all bytes have been summed).

In the first seven lines (00 to 06) of the program the microprocessor uses commands in its locally loaded command list (loaded by the LPO type DCB) to place the initial byte count value (contained in word 6 of the LPO type DCB) in working registers R3 and R2. Commands in lines 07-0A cause the microprocessor to OR the contents of R2 and R3 and determine if the result is 0 (a 0 result representing a 0 byte count and therefore a terminating condition).

Since the byte count is not 0 at this point in the program the microprocessor performs instructions on lines 0B and 0C causing it to clear accumulator register A0 and reload a (first) command list element from the host system into a local (host input) register. The next three instructions (on lines (0D through 0F) cause the microprocessor to add the most significant byte of the just reloaded command list word to the present contents of A1 (the "initially zero" least significant byte of the partial checksum), and perform a conditional jump at line 0F to the instruction at line 19 of the command list. If the just-mentioned addition produced a carry the jump is executed; otherwise, the instruction at line 10 is performed. If a carry is produced the contents of R0 (i.e. the most significant byte of the checksum) are increased by 1 and at line 1A a return is made to the line following the jump origin line (i.e. line 10).

The microprocessor then sequences through commands in lines 10-13 where it encounters another conditional jump. In this sequence the second byte of the reloaded command list word is added to the contents of A1 (the partial checksum) and the jump to line 19 is taken or not taken dependent upon the generation or non-generation of a carry. If a carry occurred, the contents of R0 are increased by 1 and a return this time would be taken to line 14 (the line following the line containing the last jump instruction).

The next instruction at line 14 causes the microprocessor to decrement the contents of R3 the least significant byte of the partially formed byte count) by 1. If this decrement results in a borrow, the instruction at line 15 evokes a conditional jump to line 1B where an additional decrement is performed relative to the contents of R2 (the most significant byte of the partial byte count), and the return instruction at 1C returns the microprocessor sequence to line 16 which causes the contents of R3 to be decremented a second time by 1 (the second decrementing operation at line 16, in effect, decreases the partial byte count by the length of the transferred word, i.e. 2 bytes). Next at line 17 a jump to line 1B is again conditioned on the generation or non-generation of a borrow. If the jump is taken then R2 is decremented and the sequence returns to line 18. If the jump is not taken, the instruction at line 18 is performed immediately after the instruction at line 17.

Line 18 contains an unconditional jump instruction which causes a return to line 07 and starts a repetition of the preceding sequence. Accordingly, the next word in the command list is fetched, reloaded from host storage into the host input register, its bytes are added to the partial checksum, the byte count is decremented by 2, and so forth. This process continues repeatedly until all of the words in the command list have been refetched from host storage to the host input register the final checksum has been formed and the byte count has been decremented to a value of 00.

When that happens the terminating condition encountered at line 0A causes a jump to line 1D which contains a sequence of instructions for transferring the two bytes of the final checksum to the host system and terminating the operation. Note that this application effectively eases the burden on host system software for calculating the checksum associated with each command list. Note also that in this particular example the program calculates the checksum of its own command list, but could just as easily be used to calculate the checksum of a different list by effectively specifying a different command list boundary in the SPO type DCB which activates the checksum calculator. It should also be recognized that, although the checksum calculator in this example is embedded in the command list whose checksum is being formed, it need not represent the entirety of that list. It only represents a subset of 33 instructions, and following instructions in the command list could be used to perform any other functions performable in offline mode.

13.3 EXAMPLE OF APPLICATION USING COMBINATION OF PO AND HS MODES

In this example, termed "virtual adaptation", the attachment subsystem is used to emulate an adapter required by a device for which the available collection of host system attachments is inadequate. Assume, for instance, an "alien" tape drive device.

The host system in this instance would load a command list program into the subject attachment, directing it in effect to emulate the adaptation functions required to prepare the tape subsystem for a data transfer (locating a desired record position on the tape, etc.). Then by DCB chaining an HS mode Read or Write DCB would be accessed for transferring a block of data between the host and the tape. Then by DCB chaining another list could be loaded for causing the attachment to perform "clean-up" operations (collecting final status, determining if error occurred and presenting a suitable terminating interruption to the host system).

13.4 DUAL MODE APPLICATIONS

This class of examples is based on the form of the SPO type DCB as shown in FIG. 5 and variations thereof. Words 2, 3, 6 and 7 of that DCB provide start address and length (byte count) information defining two areas in host storage. These areas may be entirely separate, or overlapping or fully coinciding. As shown in FIG. 5, these areas are designated as "Read" and "Write" areas. The Read area is reserved by the DCB for receiving data from the attachment (under direction of Xfer and DI/DO secondary command list commands) and the Write area is reserved for storing data which is to be transferred to the attachment. With these parameters and suitable secondary level programming (via a command list as described above or by direct microprogram controlled operations of the attachment microprocessor) the secondary subsystem can be made to transfer data between the designated host storage areas and either the attachment or a device. (e.g. using DIDO and XFER), and it can logically manipulate bits or bytes of the data to perform various signal processing and conversion operations as portions of the data. By such operations the attachments can be made to process a data set.

Examples of such operations, for accomplishing encryption and decryption of data relative to nonsecure communication links, are described with reference to FIGS. 13–15. Other applications will become evident to those skilled in the art as the description of these applications progresses.

The impracticality of having these operations performed in a secondary subsystem lacking the dual mode offline capability associated with this SPO type DCB will be pointed out as the description progresses. It may be noted immediately, however, that the use of plural DCB commands to accomplish these transfers and conversion effect would not be feasible because of the assumption that only parts of the data to be transferred can be stored in the attachment due to capacity limitations.

Figure 13:
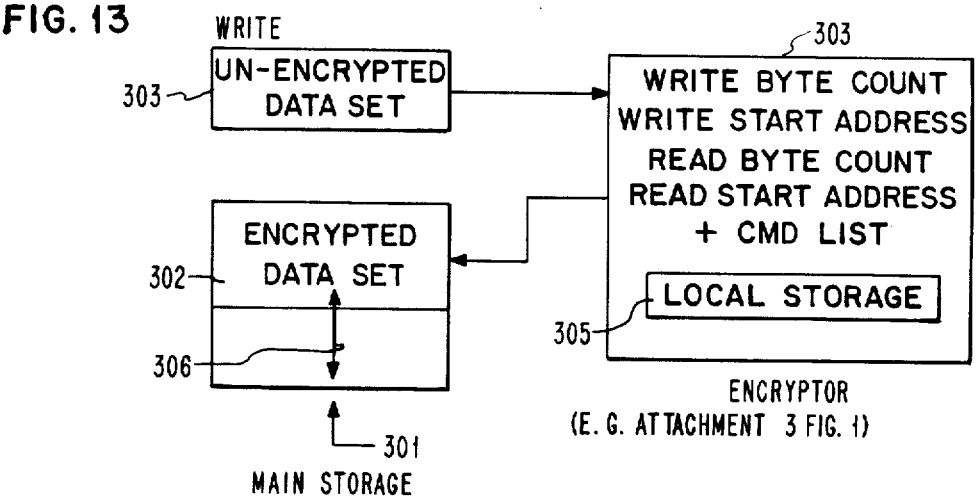
FIGS. 13-15 illustrate various dual mode real time applications for subject SPO type DCBs.

FIG. 13 shows a dual mode encryption operation using host Read and Write areas defined by an SPO type DCB. A variation of this, described with reference to FIG. 14, permits the attachment to receive portions of two (large) data sets from two "read" areas in host storage defined by an SPO type DCB and logically processes received portions of both sets to generate therefrom a third (encrypted) data set for transmission piecemeal over a secure communication link. In this application also the attachment cannot store either of the two data sets and, therefore, it would not be practical to perform this operation by transferring the data set with one DCB and operating on it with a different DCB (or the equivalent). In another variation shown in FIG. 15 the attachment decrypts data received at its device interface and places the decrypted data and related "seed" information for a future encryption session in two separate "write" areas of host storage defined by an SPO type DCB.

Referring to FIG. 13, words 2 and 3 in an SPO type DCB having the form shown in FIG. 5 define a "read" (input) storage area 301 in host main storage 302 and words 6 and 7 of that DCB define a write storage area 303. A secondary subsystem indicated at 304 (e.g. the present attachment) contains a local storage facility 305 (e.g. RAM 252) whose capacity may be less than that of either the Read area 301 or the Write area 303. Furthermore, as suggested at 306 the size of area 301 may be smaller, larger or equal to that of area 303.

With suitable secondary command programming, or equivalent direct ("non-assembly") microprogramming, on receiving the DCB defining areas 301 and 303 the attachment may be directed to transfer to its local storage 305 "unencrypted data" shown in Write area 303, on a piecemeal basis (e.g. using a secondary DIDO type commands described previously), received and stored, then to perform a conversion operation to encrypt the transferred data portion (e.g. by using secondary commands for logical byte manipulation as described previously), and then to transfer the resulting encrypted data portion to the Read area 301 (e.g. by means of a DIDO command). This process is repeated until the entire unencrypted data set in area 303 has been encrypted by the attachment subsystem and the corresponding encrypted data set has been stored in area 301. The encrypted data stored in area 302 may then be passed to a non-secure communication link (e.g. a teleprocessing link) in a high speed Write transfer (either through the attachment subsystem 304 if that subsystem has a connection to a communication link or through a different attachment connecting to the channel of the host subsystem).

Figure 14:
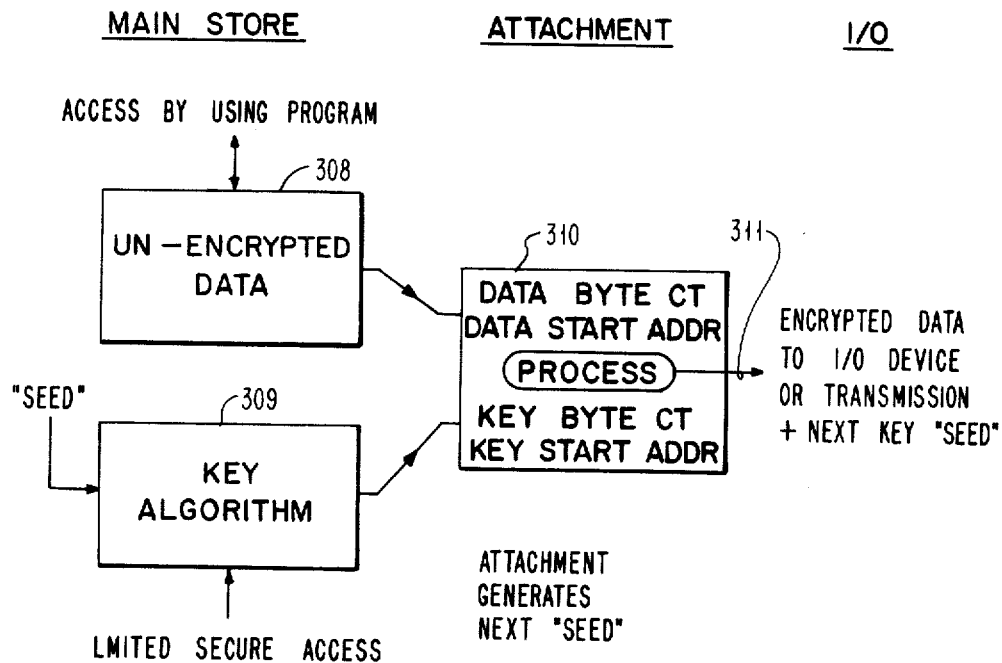

In the variation of this application shown in FIG. 14, it is assumed that host main initially storage contains unencrypted data and a key algorithm in two discretely separate "write" areas 308 and 309 and that the attachment subsystem indicated at 310 is connected either to a non-secure I/O device or transmission link indicated at 311. Furthermore, it is assumed that the SPO type DCB, as described in FIG. 5, has two previously not-shown bits in areas previously characterized as unused, for designating the information in words 2 and 3 as defining either a Read or Write area and the information in words 6 and 7 as defining either a Read or Write area, and that in the example of FIG. 14 an SPO type DCB designating areas 308 and 309 has these bits set to define both areas as Write (output) areas. Accordingly, when sent to a suitable programmed subsystem 310 this DCB would permit the subsystem to transfer portions of the information in area 308, together with encrypting information from area 309 (e.g. using DIDO commands), use the information received from area 309 to encrypt data received from area 308, and transfer encrypted data at its output interface 311 (e.g. by another DIDO command). The attachment could repeat this process until all the data has been encrypted and transmitted in encrypted form over link 311.

The encryption process may be based upon a variable "seed" function 312 and the attachment may generate residual seed functions during the encryption process. At the end of the transmission session the final residual seed function may be sent over link 311 for use at the opposite end of the system to permit that end to originate another encryption and transmission session based on that seed.

In this example the changing of the seed with each session, the location of the key algorithm and encrypted data in separate (and potentially separately protected) areas of host storage provide enhanced security, inasmuch as users of the host system having access to the unencrypted data may be barred from access to the initial seed or the key algorithm.

Figure 15:
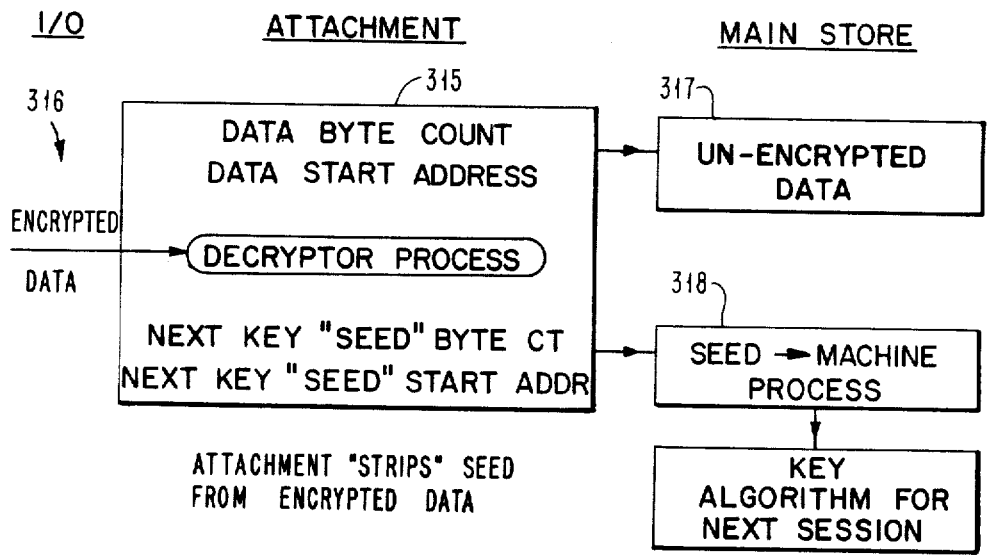

FIG. 15 illustrates an application in which the attachment subsystem 315 receives encrypted data from a teleprocessing link 316, performs a piecemeal decryption process on the data and transfers the decrypted data and seed information for starting a future encryption session to respective "read" areas 317 and 318 in host storage. In this application it is assumed that an SPO type DCB prepared by host system 319 defines 317 and 318 to the attachment as Read (data input) areas.

In this example the encrypted data is received piecemeal by the attachment. Using a secondary command program (of DIDO commands) or an equivalent non-assembly microprogram previously stored, the attachment de-encrypts the data and transfers the unencrypted data to area 317 (using DIDO or equivalent transfer operations). As each portion of data is decrypted a residual seed is formed and the "final" residual seed is stored in area 318, permitting its use by host system 319 for generation of a key algorithm to be used in the next outgoing communication session.

Note that in this example also, users of the host system and the data may be denied access to both the key algorithm and the seed function. Note further that the key algorithm is generated by a process not available on the encrypted data path and that a new key algorithm and seed can be generated on each session.

Those skilled in the art will appreciate that there are many potentially equivalent applications for use of such "dual mode" SPO type DCB descriptors. For instance, it could be used by a microprocessing attachment having limited storage to perform matrix multiplications, fourier transformations, or other "signal processing" operation. The information to be transformed would pass piecemeal to the attachment and the result information return piecemeal to the host system.

The plural mode DCB structure could be used to support: full duplex communication schemes or multiple data transmission sessions under the envelope of a single DCB.

Furthermore, those skilled in the art should recognize that the dual mode SPO type DCB or the equivalent, containing parameters defining two storage areas, could easily be extended to permit definition of three or more storage areas (e.g. two storage areas to hold elements of two matrices and one area to transfer to an attachment to receive a product matrix formed by the attachment). Another feature of this plural mode application is that information sent from the host system to the attachment in any of the foregoing operations is preservable in its original Write area so that upon occurrence of an error (in its transfer to the attachment subsystem) the recovery process of the host system could be simplified. In prior systems wherein an area containing data is allowed to be overwritten as the data is externally transferred recovery is complicated because the original data may no longer be available when error is detected and, therefore, may have to be generated through a repetition of a "long" (i.e. costly) software process.

The multiple storage areas may be in the same key protected area or in different key protected areas of storage. If multiple keys are to be used they would be specified in areas of the SPO type DCB presently marked unused or reserved. Furthermore, it should be recognized that the dedication of the two "Dual Mode" storage areas in host storage may be easily defined by signals from the device, and in certain applications this type of "deferred" dedication may be useful.

The Residual Status Block (RSB) parameter described previously allows for storage of concluding status relative to two series of dual mode data transfer operations; in the described embodiment relative to input and output transfers to and from host storage of the type used in the SPO type application/format of FIG. 13. This permits the attachment to perform its secondary command programs without having to interrupt the host system after each fractional transfer of data relative to either area. It also permits the attachment to pass status information to the host processor in a single interruption to report the concluding status of its dual mode operations under a single SPO type DCB (rather than requiring separate interruptions for transfer status relative to each designated host area).

13.5 MULTIPLEXING/DEMULTIPLEXING APPLICATION

In this unillustrated application the device interface of the attachment subsystem is connected to a device multiplexor. In turn the multiplexor controls up to eight devices (e.g. process sensors and actuators). The attachment addresses these devices in a rotating sequence by presenting "sub-addressing" signals on certain interface lines (S0, S1, S2) described in the referenced copending application by Andrews et al, Ser. No. 345,129 (the attachment and devices have a common "device address" relative to the host). As each device is addressed, data may be sent to or received from the device (e.g. by DIDO or XFER type commands). If a high speed mode transfer of data to or from the host system is required a terminating condition may be presented by the device, causing the attachment to retain its device addressing status and chain to an HS mode DCB for conducting the transfer. After this transfer the DCB may evoke further chaining to LPO and SPO type DCB's for continuing the device "polling" or "interrogation" sequence at the position of the device which would have been interrogated next if the terminating condition had not been presented.

14 REVIEW OF SYSTEM OPERATIONS AND CONCLUSIONS

Figure 16:
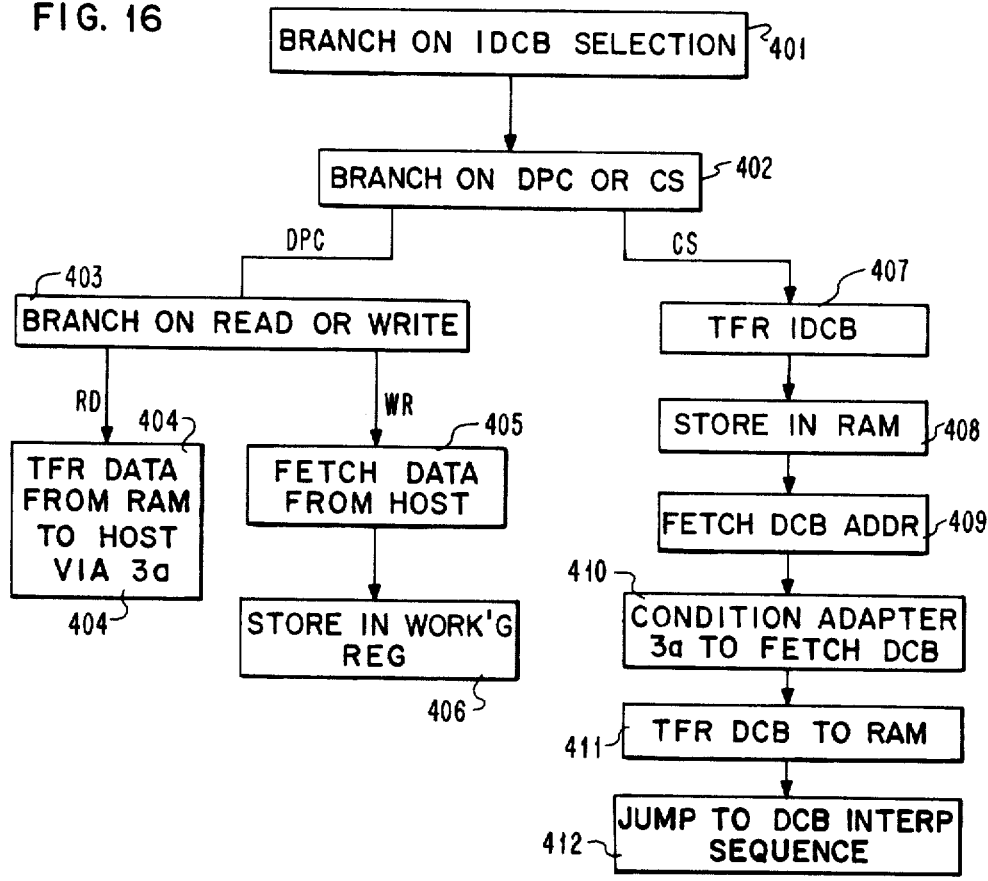
Figure 17:
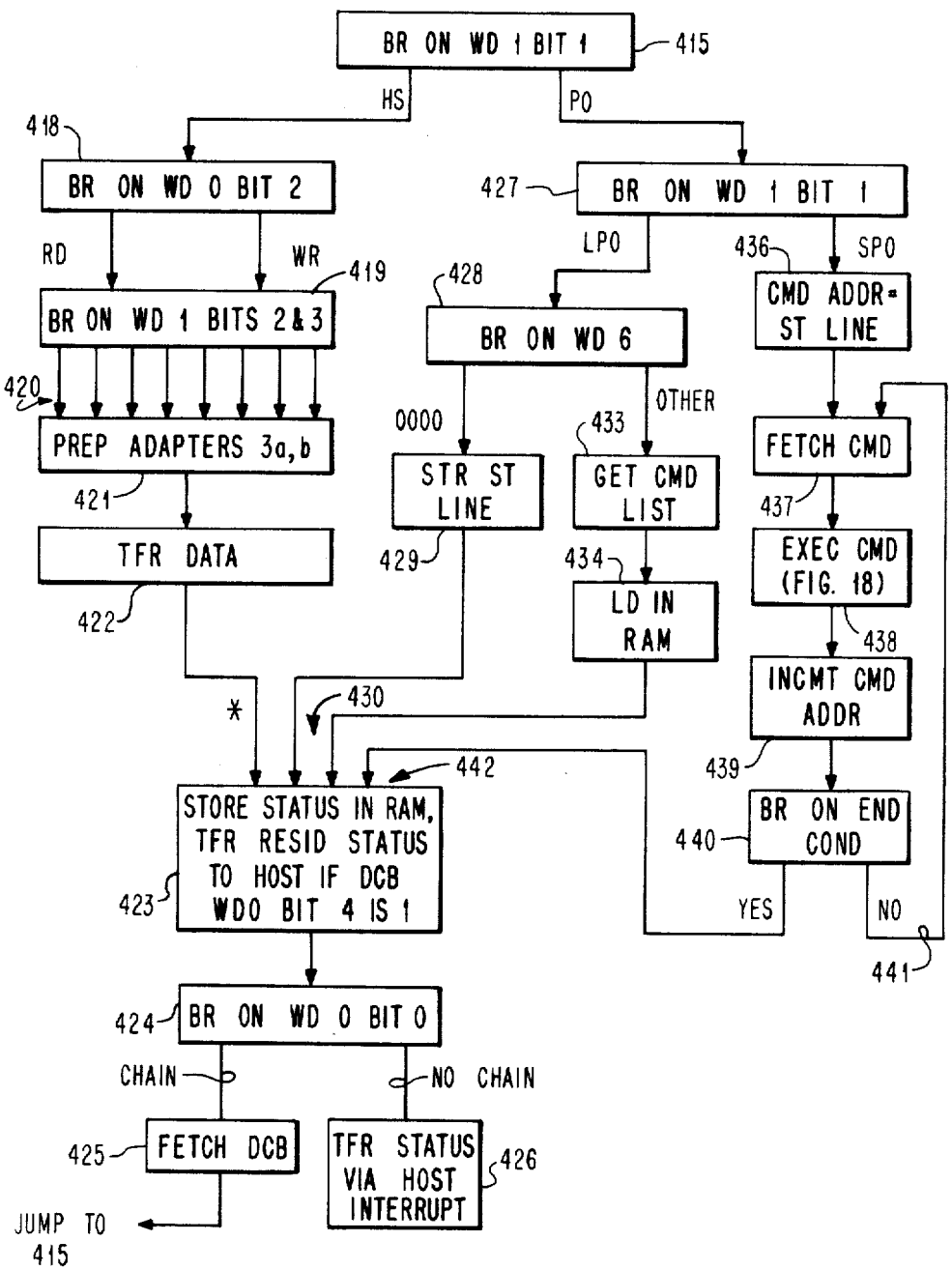

FIGS. 16-18 provide an overview of the operations performed by the host and attachment subsystems in respect to the subject invention.

FIG. 16 illustrates the process associated with IDCB interpretation. Branching its operating sequence when it encounters an IDCB instruction (at 401) the host subsystem varies its sequence at 402 on the type of command specified in the command field of the IDCB (54, FIG. 4). If the IDCB specifies a DPC (direct program control) operation the attachment subsystem is selected and the sequence branches at 403 on the direction of transfer effectively specified by the IDCB command field information (read or write). Data is then transferred either to or from the immediate data field if the IDCB (operation 404 or 405) respectively from or to the attachment. If a read (input) operation is specified data is passed from attachment local storage through adapter 3a to the host system and stored by the host processor in the immediate data field of the IDCB (in host storage). If a write (output) is specified the data is passed through adapter 3a to the attachment microprocessor and stored in attachment local storage (RAM 252, FIG. 12).

If a CS (cycle steal) operation is specified by the IDCB, the host processor selects the attachment and transfers the IDCB information to the attachment for storage in attachment local storage (operations 407 and 408). Upon accepting this IDCB information the attachment microprocessor is stimulated to perform additional operations 409-412 for DCB retrieval and information, and the host processor is released immediately after the transfer (for interpreting other instructions in its program, attending to interrupts, etc.). The attachment microprocessor fetches the DCB address contained in the "immediate data field" portion of the now locally stored IDCB information (operation 409) and conditions adapter 3a to fetch the DCB occupying that address in a cycle stealing operation 410. Adapter 3a passes the retrieved DCB via the microprocessor, to attachment local storage (operation 411) and the microprocessor then enters its stored subroutine 412 for interpreting the now locally stored DCB. Microprocessor subroutines for retrieving the DCB and interpreting it are contained in section 262 of ROS 251, FIG. 11.

Presently relevant aspects of DCB interpretation subroutines are illustrated in FIG. 17. Branching on the mode bit contained in bit 0 of DCB word 1 (step 415), the microprocessor selects either a subroutine 416 associated with preparation of an HS operation or a subroutine 417 associated with PO mode operation. Assuming selection of the HS subroutine, the microprocessor branches at 418 on bit 2 of DCB word 0 which indicates the direction of the high speed data transfer designated by this DCB (read/input to host storage or write/output from host storage). Depending on the combined values of this bit and bits 2 and 3 of DCB word 1 (the format specifying bits) an 8-way branch is taken at 420 to operation 421 for preparing adapters 3a and 3b to conduct operation 422 for transferring data between the host system and the external device in one of two directions (Work) and one of four formats (8 or 16 bit unidirectional, 16 or 32 bit bidirectional).

When the transfer operation concludes the microprocessor stores status in its local RAM (operation 423) and branches at 424 on the chaining flag bit in the DCB (word 0 bit 0). If word 0 bit 4 is 1 the attachment forwards residual status to the host at step 423. If chaining is specified the microprocessor operates at 425 to fetch a next DCB from the host storage location designated in word 5 of the current DCB and begins to interpret that DCB. If chaining is not specified at 424 the operation concludes at 426 with a transfer of concluding status to the host system via an interruption.

If the PO branch had been taken at 415 the attachment would have been branched at 427 on the "type bit" (word 1 bit 1) which distinguishes the respective DCB as either an LPO type or SPO type PO mode DCB's. If LPO type is specified the microprocessor branches at 428 on the list length factor (DCB word 6). If the length factor is 0000 (Hex) and a command list had previously been loaded the microprocessor stores the start line information (DCB word 3) locally (at 429), stores status at 430 and branches at 431 on the chaining bit (to either a next DCB via 432 or a concluding status transfer 433 to the host).

Had the SPO branch been taken at decision point 427 the microprocessor would have performed operations 436-442. In these operations the microprocessor would prepare the start line information saved from word 3 of the last previously interpreted LPO type command in the command address register and access the associated command list instruction (operations 436 and 4370, execute the command (operation 438), increment the command address (operation 439), and branch at 440 on the existence or non-existence of an ending condition as specified previously. If the ending condition is present the microprocessor would store status (operation 442) and take the chaining flag branch 431 previously discussed. If the ending condition is not present the microprocessor sequence would branch through path 441 to the command fetching operation 437. This directs the microprocessor to the command position defined by the incremented address, etc.

The foregoing is grossly simplified inasmuch as it does not illustrate the handling of Jump and Return commands. These functions and the specific commands discussed above are not part of the present invention. Furthermore, those skilled in the art understand that Jump and Return instructions are handled at an appropriate decision point by a branch or the Jump condition. If the condition is met the current instruction address is saved. The target instruction address designated by the Jump instruction is substituted in the instruction address register. Upon execution of the Return command the saved (incremented) address is loaded into the address register for continuing the interrupted sequence.

FIG. 18 illustrates command execution (in a simplified form) beginning with the preparation of the initial command address at 451, and continuing with the fetching of the command at 452, and the decoding of its operation code bits 0-4 at 453. These five bits branch the microprocessor sequence to one of thirty-two subroutines indicated at 454 and a further branch is taken at 455 on the condition of the direct/indirect bit (bit 5). If this bit indicates a direct operation the data in the immediate field is utilized as data. If this bit represents an indirect form of operation the data in the immediate field is used as an addressing parameter.

The dotted outline blocks 456, 457 indicate the performance of data movement and logical data manipulation functions, respectively. For simplicity the handling of Jump and Return functions is not shown. As explained previously these are useful to cause a conditional branch to a command contained at a jump location designated by the immediate field, and a return to an instruction immediately following the Jump instruction. After execution of each instruction command address is incremented at 458 (and saved if a Jump is taken) and the end condition is tested at 459. If the end condition is present status is stored and a chaining bit branch is taken at 460. If the end condition is not present the sequence proceeds with the fetching of the command designated by the present contents of the command address register.

As previously noted the end condition for terminating execution of command list commands can be generated either by the device or by a command being interpreted. A caveat in respect to explicit termination by command is that it should not be permitted to occur while the command sequence is in a jump subroutine, since the command list addressing at such times may be indefinite, and it becomes difficult for the host system to properly schedule continuation of the interrupted sequence.

The command list programmer then has the option of restarting at the point determined by conditions present at the time of termination by specifying the next line in sequence following the last line executed.

Conversely the programmer also has the option of ignoring the conditions which were present for the jump instruction at the time of termination by restarting at the jump instruction line.

We have shown and described above an improved secondary subsystem which, by virtue of its chainable high speed and programmable offline modes of operation, provides a degree of versatility which it is believed could not be achieved with pre-existing secondary subsystems. Accordingly, while there has been described what is at present considered to be a preferred embodiment of this invention, it will be obvious to those skilled in the art that various changes and modifications may be made therein without departing from the invention. It is, therefore, intended to cover all such changes and modifications in the following claims as falling within the true spirit and scope of the invention.

I claim:

1. A method of conducting distributed data processing operations in a data processing system containing primary and secondary subsystems, said secondary subsystem having at least one device attached thereto and operating as an I/O controller for transferring data between said primary subsystem and said device, each subsystem having a respective processing facility for performing logical data processing operations and having an associated memory facility to which it refers exclusively for fetching and storing data on which its logical data processing operations are conducted, said method comprising:

in a first discrete process involving interaction between the processing facilities of said primary and secondary subsystems, transferring a unit of primary command information from said primary subsystem to said memory facility associated with said secondary subsystem, said command information unit comprising program information defining a plurality of storage areas in the memory facility associated with said primary subsystem, said areas being potentially separate from each other and potentially having different data storage capacities;

in a second discrete process defined by said primary command unit, and involving interaction between said secondary subsystem and only the memory facility associated with said primary subsystem, transferring a program of secondary commands from said primary subsystem to said memory facility associated with said secondary subsystem, said secondary commands being defining data transfer operations between said memory facility associated with said secondary subsystem and both said at least one device and said plurality of storage areas, as well as logical processing operations to be conducted on data contained in said memory facility associated with said secondary subsystem;

in a third discrete process, in response to said secondary commands, performing any of the following operations: transferring sets of data in one or the other or both directions between said plurality of data storage areas and said memory of said secondary subsystem, transferring sets of data in one or the other or both directions between said memory of said secondary subsystem and said device, and performing a logical data processing operation on data contained in at least one of said transferred data sets.

2. The method of claim 1 wherein said at least one data set is larger than the available capacity of said memory facility associated with said secondary subsystem, and said steps of transferring said data sets and performing said logical processing operations are conducted alternately in a piecemeal manner on discrete portions of said data sets which are contained together with said primary command unit and said secondary command program in said secondary subsystem memory facility.

3. The method of claim 2 wherein said plurality of areas in said primary memory consists of two areas, and said data transferring and processing steps are conducted relative to two corresponding data sets.

4. The method of claim 3 wherein one of said two areas is designated by said command unit as an input storage area for exclusively storing data received from said secondary subsystem and the other area is designated as an output storage area for exclusively storing data to be transferred to said secondary subsystem.

5. The method of claim 3 wherein said plurality of primary subsystem memory areas consists of two areas, both designated by said command unit information as input areas for exclusively storing two respective data sets to be received from said secondary subsystem.

6. The method of claim 3 wherein said plurality of primary subsystem memory areas consists of two areas, both designated by said command unit information as output storage areas for exclusively storing data in respective data sets which are to be transferred to said secondary subsystem.

7. A method of conducting distributed data processing operations in a data processing network containing primary and secondary subsystems, said secondary subsystem connecting said primary subsystem to a device attachment interface addressable from said primary subsystem by a predetermined device address number which also designates said secondary subsystem, said device attachment interface having ports for connecting to one or more devices or to another secondary subsystem which in turn serves to connect to another primary subsystem, each of said subsystems containing a respective local data processing facility and a respective local memory facility which are used exclusively by the respective subsystem when conducting respective logical data processing operations, the secondary subsystem having access to the local memory of the primary subsystem independent of the local processing facility of the primary subsystem, said method comprising:

preparing a fixed length unit of primary command information and a variable length program of secondary commands in said local memory in said primary subsystem;

transferring said primary command unit and said secondary commands to said local memory in said secondary subsystem in a single synchronous operation of said primary and secondary subsystems;

with said secondary subsystem operating independent of the local processing facility in said primary subsystem in response to information contained in said primary command unit and said secondary commands, transferring a first data set from a predetermined first area portion of the local memory of the primary subsystem to the local memory in said secondary subsystem, said first area being defined by information contained in said primary command unit, said first data set containing an amount of data exceeding the available storage capacity of the local memory in said secondary subsystem, said transfer of said first data set being conducted piecemeal on successive fragmented portions of said set, each portion being contained together with said primary command unit and said secondary command program in said local memory of said secondary subsystem;

conducting a logical data processing operation on each of said fragmented portions of said transferred first data set, in said processing facility in said secondary subsystem, to generate fragmented portions of a second data set representing a logical transformation of said first data set; and with said secondary subsystem still operating independent of the processing facility of the primary subsystem; transferring each said fragmented portion of said second data set to a predetermined second area in said primary subsystem local memory prior to transferring a next fragmented portion of the first data set to said secondary subsystem's local memory, said second area being designated by information contained in said transferred primary command unit.

8. A method of conducting a distributed data processing operation in a data processing network containing inter-communicating primary and secondary data processing subsystems, said secondary subsystem further communicating with a device having a device address designation in said primary subsystem which is the same as an address designation used to address the secondary subsystem, each of said subsystems containing local processing facilities and local memory facilities which are used exclusively by the respective subsystem for conducting its logical data processing operations, said method comprising:

preparing a unit of fixed length primary command information and a variable length program of secondary commands decodable by said secondary subsystem in said primary subsystem local memory, said primary command information designating two storage areas in said primary subsystem local memory respectively containing first and second output data sets to be sent to and logically processed by said secondary subsystem, at least one of said first and second sets containing an amount of data exceeding the available storage capacity in said secondary subsystem local memory;

transferring said primary command unit and said secondary command program to said local memory in said secondary subsystem;

with said secondary subsystem processing facility operating independent of said primary subsystem processing facility and in response to said transferred command unit and secondary command program, instigating piecemeal transfers of discrete corresponding parts of fragmented portions of said first and second data sets to said local memory in said secondary subsystem, under the control of said secondary subsystem processing facility, until all of the data in both said sets has been transferred, said corresponding fragmented portions being contained with said command unit and secondary command program in said local memory of said secondary subsystem;

under the direction of said secondary subsystem processing facility, operating in response to said secondary command program, conducting logical data processing operations on each said pair of corresponding fragmented portions to generate fragmented portions of a third data set logically related to said first and second sets; and under the direction of said secondary subsystem processing facility, operating in response to said secondary command program, transferring each said third data set fragmented portion to said device prior to transferring a next pair of said first and second set portions.

9. A method of conducting a distributed data processing operation in a data processing network containing inter-communicating primary and secondary data processing subsystems, said secondary subsystem further communicating with a device having a device address designation in said primary subsystem which is the same as an address designation used to address the secondary subsystem, each of said subsystems containing local processing facilities and local memory facilities which are used exclusively by the respective subsystem for conducting its logical data processing operations, said method comprising:

preparing a unit of fixed length primary command information and a variable length program of secondary commands decodable by said secondary subsystem in said primary subsystem local memory, said primary command unit defining discrete first and second input storage areas in the local memory of said primary subsystem for respectively receiving first and second data sets from said secondary subsystem, at least one of said first and second sets anticipated to contain an amount of data exceeding the available storage capacity of said secondary subsystem local memory;

transferring said prepared command unit and secondary command program to said local memory of said secondary subsystem;

with said secondary subsystem processing facility operating independent of said primary subsystem processing facility and in response to said transferred command unit and secondary command program, intermittently transferring discrete fragmented portions of a third data set from said device to said secondary subsystem local memory, under the control of said secondary subsystem processing facility, said fragmented portions being individually contained in said local memory together with said command unit, said secondary command program and all or part of a fourth data set;

under the direction of said secondary subsystem processing facility, operating in response to said secondary command program, conducting logical data processing operations on said discrete portions of said third data set and said fourth data set to form discrete fragmented portions of said first data set and all or part of said second data set; and under the direction of said secondary subsystem processing facility, operating in response to said secondary command program, transferring said discrete portions of said first data set and all or part of said second set to said primary subsystem local memory in discrete fragmented operations interleaved in time with the transferring operations conducted relative to said device.

* * * * *